United States Patent
Wesley et al.

(10) Patent No.: US 9,641,599 B2
(45) Date of Patent: May 2, 2017

(54) PROVIDING A NATIVE DESKTOP USING CLOUD-SYNCHRONIZED DATA

(71) Applicant: Citrix Systems, Inc., Fort Lauderdale, FL (US)

(72) Inventors: Ian Russell Wesley, Parkland, FL (US); Lin Cao, Fort Lauderdale, FL (US); Georgy Momchilov, Parkland, FL (US); Chakravarthi Valicherla, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 228 days.

(21) Appl. No.: 14/247,401

(22) Filed: Apr. 8, 2014

(65) Prior Publication Data
US 2014/0304326 A1 Oct. 9, 2014

Related U.S. Application Data

(60) Provisional application No. 61/810,048, filed on Apr. 9, 2013.

(51) Int. Cl.
*H04L 29/08* (2006.01)
*H04L 12/46* (2006.01)
(Continued)

(52) U.S. Cl.
CPC ............ *H04L 67/10* (2013.01); *G06F 3/1454* (2013.01); *G06F 9/4445* (2013.01);
(Continued)

(58) Field of Classification Search
CPC ............... G06F 9/4445; G06F 3/1454; G09G 2360/121; H04L 67/10; H04L 12/4641; H04L 63/0272
See application file for complete search history.

(56) References Cited

U.S. PATENT DOCUMENTS 8,365,203 B2 * 1/2013 Wong .................... G06F 9/4443
715/234
8,850,516 B1 * 9/2014 Hrebicek .......... G06F 17/30117
707/610

(Continued)

FOREIGN PATENT DOCUMENTS

JP 2011-513816 A 4/2011
WO 2012092553 A1 7/2012
(Continued)

OTHER PUBLICATIONS

Oct. 19, 2016 (KR) Office Action—App. 10-2015-7032018.
Jan. 12, 2017 (JP) Notification of Reasons for Refusal—App. 2016-507613.

*Primary Examiner* — Chirag R Patel
(74) *Attorney, Agent, or Firm* — Banner & Witcoff, Ltd.

(57) ABSTRACT

Methods, systems, computer-readable media, and apparatuses for providing a native desktop using cloud-synchronized data are presented. In some embodiments, a desktop management service provided by at least one computing device may selectively store data from a remote desktop. Subsequently, the desktop management service may synchronize the stored data with a cloud-based data storage platform. Thereafter, the desktop management service may cause a native desktop to be presented on a client device using the synchronized data. In some arrangements, the extracted, analyzed, and/or selectively stored data may include one or more application shortcuts, one or more documents, one or more registry keys, one or more personalization settings, or one or more layout settings. Additionally or alternatively, the remote desktop may be associated with a first operating system, and the native desktop may be associated with a second operating system different from the first operating system.

20 Claims, 16 Drawing Sheets

(51) Int. Cl.
*H04L 29/06* (2006.01)
*G06F 3/14* (2006.01)
*G06F 9/44* (2006.01)

(52) U.S. Cl.
CPC ...... *H04L 12/4641* (2013.01); *H04L 63/0272* (2013.01); *G09G 2358/00* (2013.01); *G09G 2360/121* (2013.01); *G09G 2370/022* (2013.01); *G09G 2370/025* (2013.01)

(56) References Cited

U.S. PATENT DOCUMENTS

| | | | |
|---|---|---|---|
| 9,009,219 B2* | 4/2015 | Chawla | H04L 67/08 709/203 |
| 9,160,796 B2* | 10/2015 | Reeves | H04L 67/1095 |
| 2009/0216975 A1 | 8/2009 | Halperin et al. | |
| 2011/0131330 A1 | 6/2011 | Beaty et al. | |
| 2011/0209064 A1 | 8/2011 | Jorgensen et al. | |
| 2011/0246904 A1 | 10/2011 | Pinto et al. | |
| 2012/0078720 A1 | 3/2012 | Pappas et al. | |
| 2012/0089906 A1 | 4/2012 | Reeves et al. | |
| 2012/0203932 A1* | 8/2012 | da Costa | H04L 67/10 709/248 |
| 2013/0067019 A1 | 3/2013 | Srinivas et al. | |

FOREIGN PATENT DOCUMENTS

| | | |
|---|---|---|
| WO | 2012-133300 A1 | 10/2012 |
| WO | 2013-012654 A | 1/2013 |
| WO | 2013-024343 A1 | 2/2013 |

* cited by examiner

PROVIDING A NATIVE DESKTOP USING CLOUD-SYNCHRONIZED DATA

CROSS-REFERENCE TO RELATED APPLICATIONS

This application claims the benefit of U.S. Provisional Patent Application Ser. No. 61/810,048, filed Apr. 9, 2013, and entitled "PROVIDING A NATIVE DESKTOP USING CLOUD-SYNCHRONIZED DATA," and which is incorporated by reference herein in its entirety.

BACKGROUND

Aspects of the disclosure relate to computer hardware and software. In particular, one or more aspects of the disclosure generally relate to computer hardware and software for providing a native desktop (e.g., on a client device, such as a mobile device) using cloud-synchronized data mined from a remote desktop.

Mobile devices (e.g., smart phones, tablet computers, other types of mobile computing devices, etc.) are becoming increasingly popular. More and more, people are using mobile devices in personal and business settings for a variety of purposes. Additionally, many people now have multiple computing devices, including one or more mobile devices, and these various devices may often be in different physical locations. For example, an example user may possess a work laptop computer that is typically located at the user's home or in their office, as well as a mobile device that the user may take with them everywhere that they go.

Regardless of where a particular person is or what device they are using, however, a user may wish to be able to access all of her electronic files, settings, and other information via the device that the user has with her. Moreover, such a user may be relatively more comfortable accessing, viewing, editing, and/or interacting with her information when it is presented in familiar and/or consistent ways.

SUMMARY

Aspects of the disclosure relate to various systems and techniques that provide more convenient, functional, and easy-to-use ways for users to access, view, edit, and/or otherwise interact with their data, particularly in situations where a user has a number of different computing devices, such as an employer-owned work computer and a personal mobile device.

For example, some embodiments discussed in greater detail below provide techniques for synchronizing information created, edited, and/or otherwise used by a user on one desktop (e.g., a source desktop, which may typically be provided on and/or accessed via a work computer, for instance) with another, different desktop (e.g., a target desktop, which may, for instance, be provided on and/or accessed via the user's mobile device). The information may be synchronized using a cloud-based data storage platform, and the synchronized information may be mined and/or otherwise obtained from the source desktop in a number of different ways (e.g., by identifying, extracting, analyzing, and/or selectively storing various files, settings, and/or other data that is used with an operating system and/or one or more applications on the source desktop; by identifying, extracting, and/or storing various user profile information associated with the user; etc.).

Additionally, using this synchronized information, the user's mobile device may present, display, and/or otherwise provide a native desktop. Such a native desktop might not only enable the user to access, view, edit, and/or otherwise interact with the information on their mobile device in a desktop that is natively rendered on and/or provided by the mobile device and its operating system, but also may enable such access, viewing, editing, and/or interaction to occur even in instances when the mobile device is not able to establish a connection to the source desktop (which may be considered a remote desktop relative to the native desktop provided on the mobile device) and/or to other networks.

By leveraging various aspects of these techniques and/or the other features and functionalities discussed in more detail below, greater convenience, functionality, and ease-of-use may be provided to users of mobile devices, particularly in situations where such users wish to access, view, edit, and/or otherwise interact with information that is stored on, maintained by, and/or otherwise used with other remote computer systems and/or computing environments.

Thus, in some embodiments discussed below, a desktop management service provided by at least one computing device may selectively store data from a remote desktop. Subsequently, the desktop management service may synchronize the stored data with a cloud-based data storage platform. Thereafter, the desktop management service may cause a native desktop to be presented on a client device (which may, e.g., be a mobile device, such as a smart phone, a tablet computer, a laptop computer, or some other type of mobile computing device) using the synchronized data.

In some arrangements, the extracted, analyzed, and/or selectively stored data may include one or more application shortcuts, one or more documents, one or more registry keys, one or more personalization settings, or one or more layout settings. Additionally or alternatively, the remote desktop may be associated with a first operating system, and the native desktop may be associated with a second operating system different from the first operating system.

In some embodiments, causing the native desktop to be presented on the client device may include causing at least some of the synchronized data to be presented using at least one native application of the native desktop. In some additional and/or alternative embodiments, causing the native desktop to be presented on the client device may include causing a remoted application to be presented on the client device if a native viewing application for at least some of the synchronized data is unavailable.

In some embodiments, after causing the native desktop to be presented on the client device, a background connection may be caused to be established between the client device and a second device that is configured to provide the remote desktop. In some additional and/or alternative embodiments, after causing the native desktop to be presented on the client device, changes made on the client device to at least some of the synchronized data may be synchronized with the cloud-based data storage platform.

In other embodiments discussed below, a computing device may determine whether a connection to a cloud-based storage platform is available. In response to determining that the connection to the cloud-based storage platform is available, the computing device may synchronize local cache data with the cloud-based storage platform, and the local cache data may include one or more files maintained on a remote desktop. Subsequently, the computing device may present a native desktop based on the local cache data.

In some instances, synchronizing the local cache data with the cloud-based storage platform may include updating the local cache data based on one or more changes made to at least one file on the remote desktop. Additionally or alternatively, synchronizing the local cache data may include updating information stored in the cloud-based storage platform based on changes made to at least one file on the computing device.

In some instances, presenting the native desktop may include receiving a request to access a cached file and opening the cached file in a native editor. Additionally or alternatively, presenting the native desktop may include presenting an arrangement of one or more elements representing the remote desktop.

In one or more arrangements, the native desktop may be presented (e.g., by the computing device) when a connection from the computing device to the cloud-based storage platform is not available.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing a native desktop (e.g., on a client device, such as a mobile device) using cloud-synchronized data, which may include data that has been mined (e.g., extracted, analyzed, and/or selectively stored) from another desktop remote from the native desktop provided on the client device. Before discussing these concepts in greater detail, however, several examples of computing architecture and enterprise mobility management architecture that may be used in implementing and/or otherwise providing various aspects of the disclosure will first be discussed with respect to FIGS. 1-6.

Figure 1:
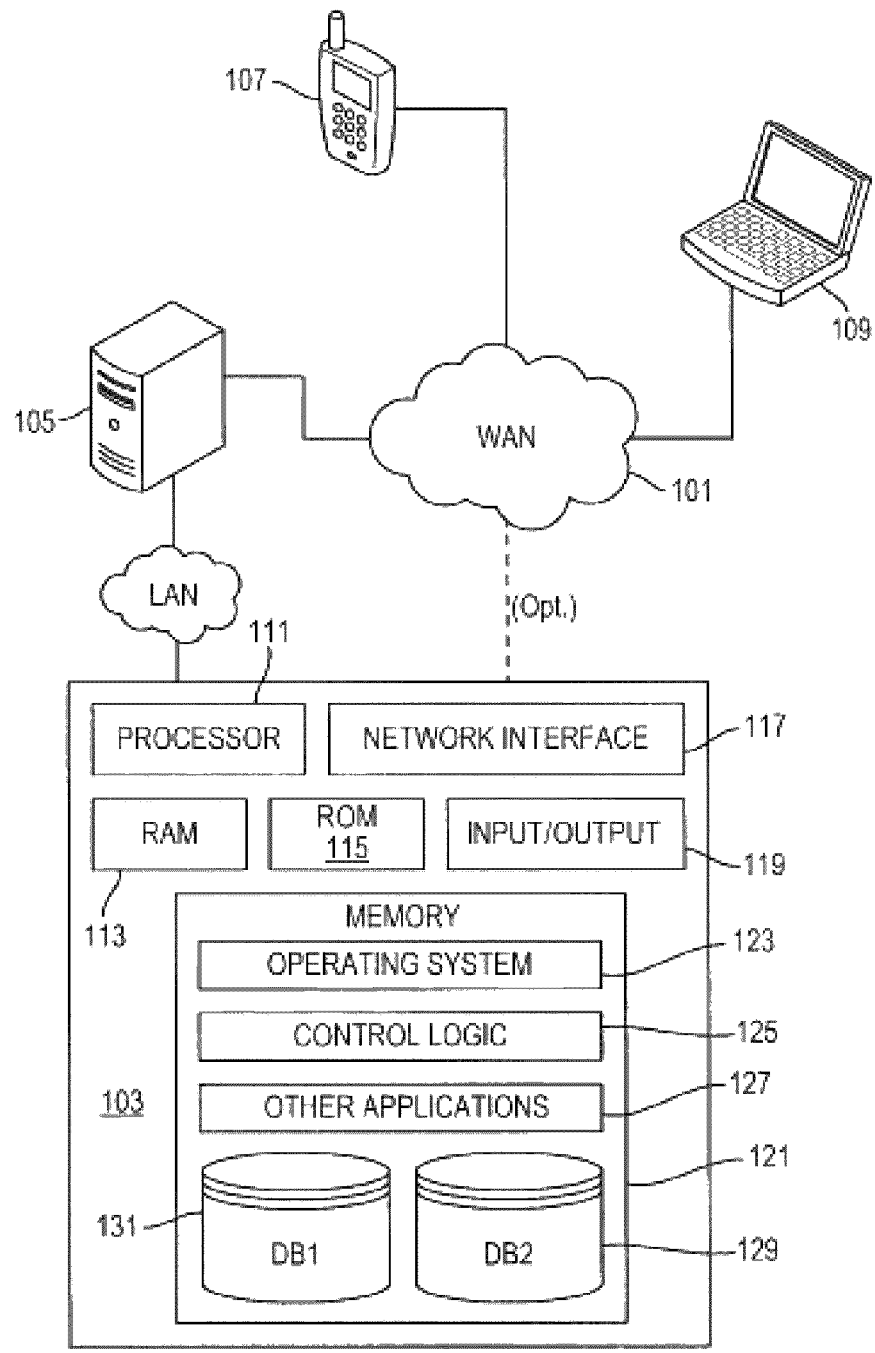
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
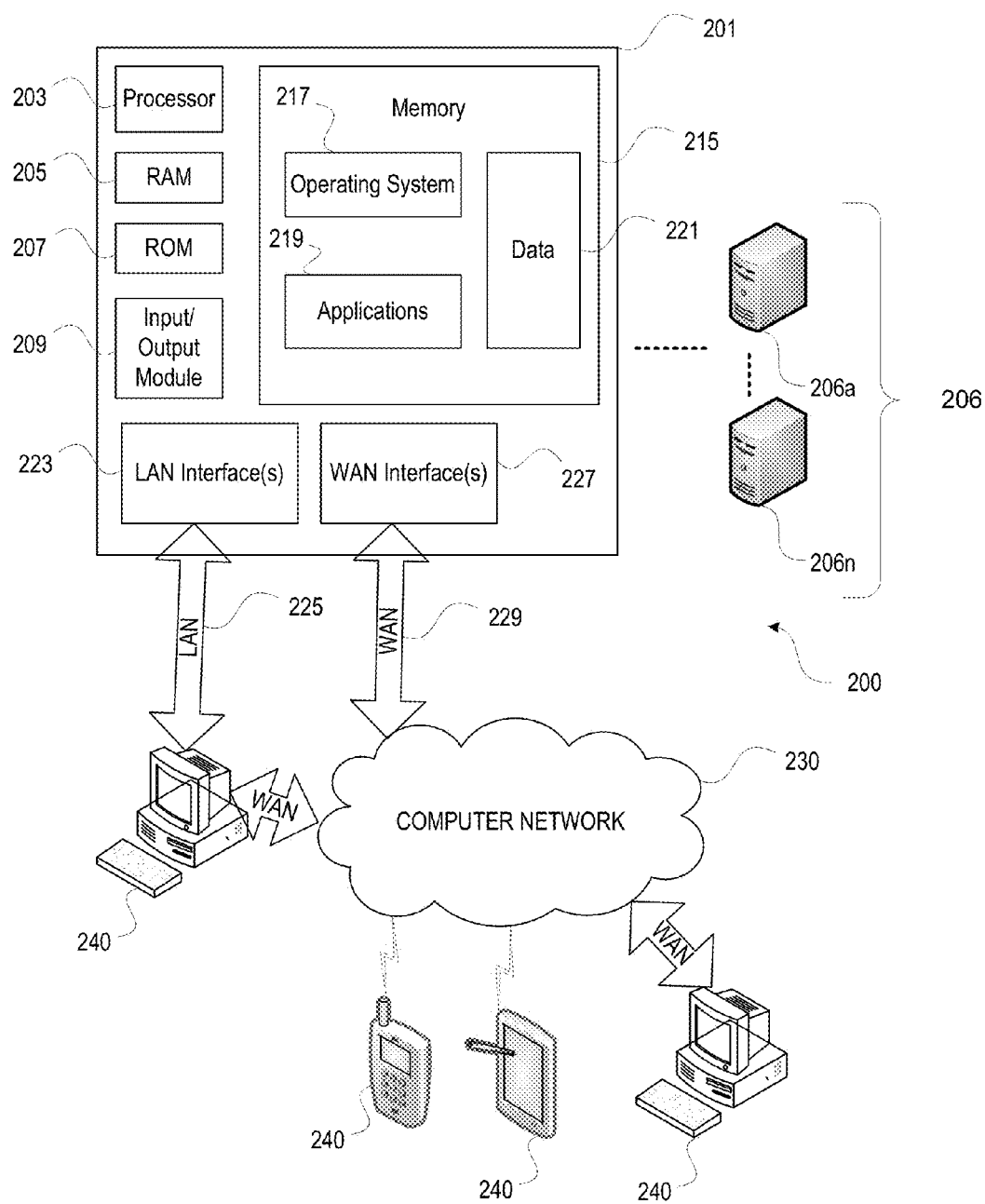
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
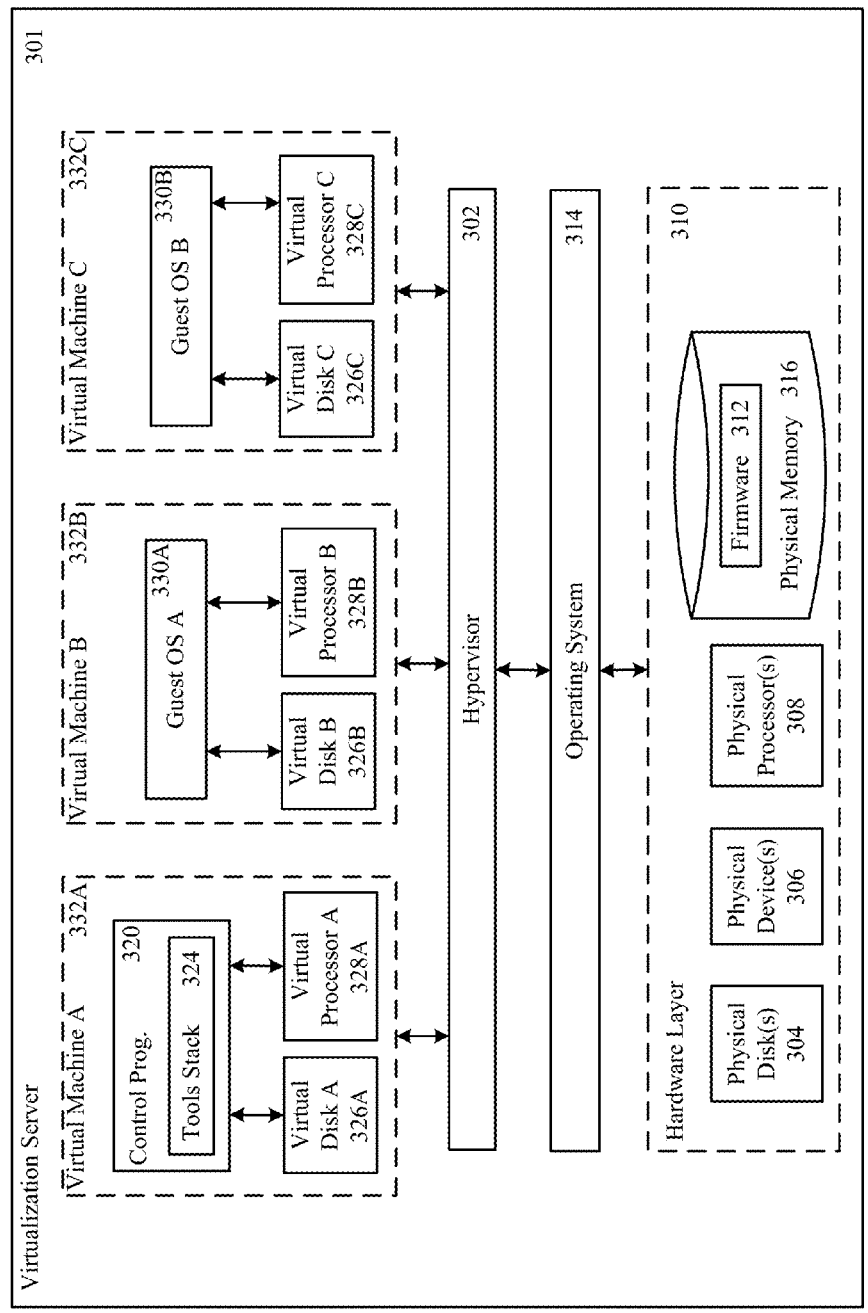
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332.

In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
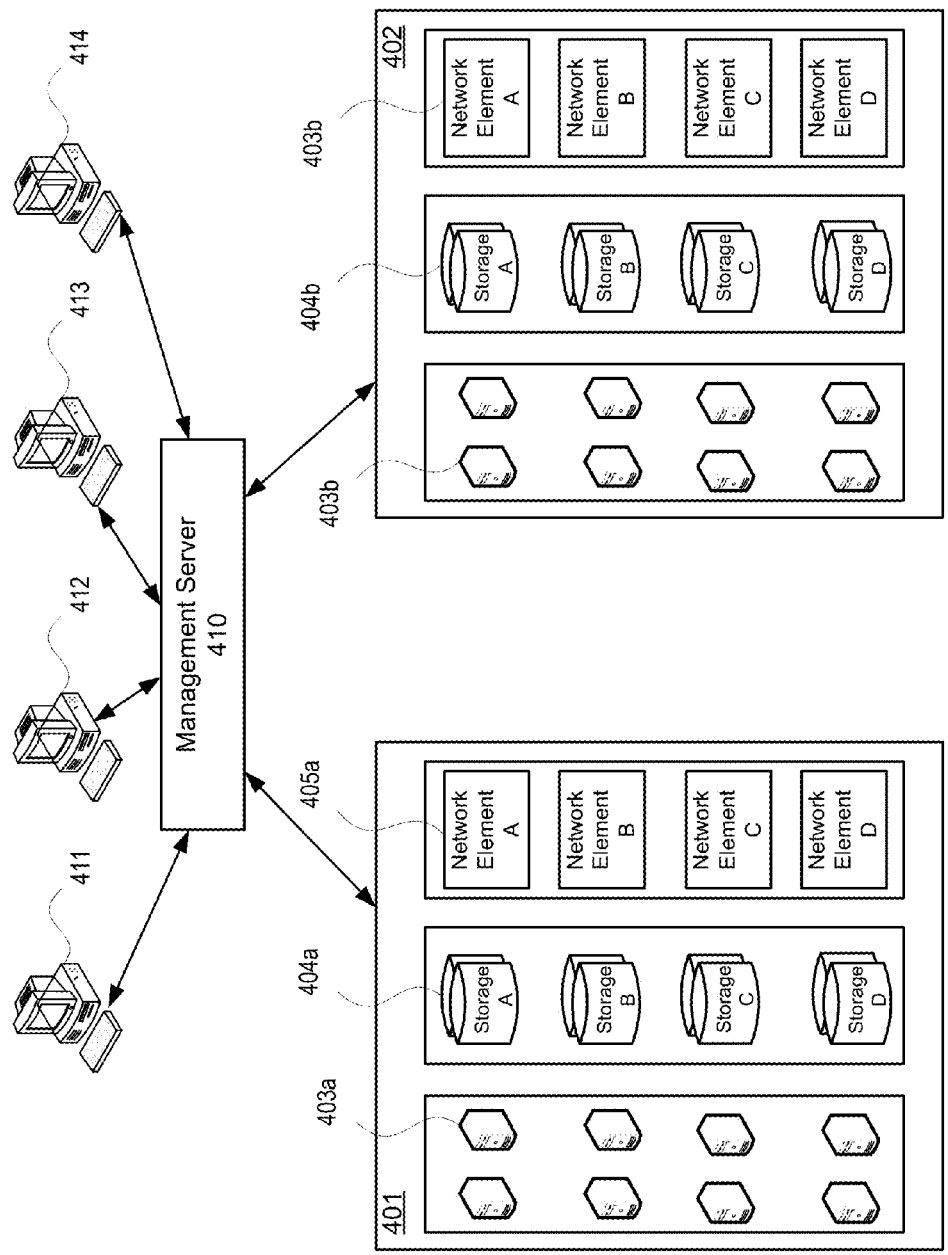
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 5:
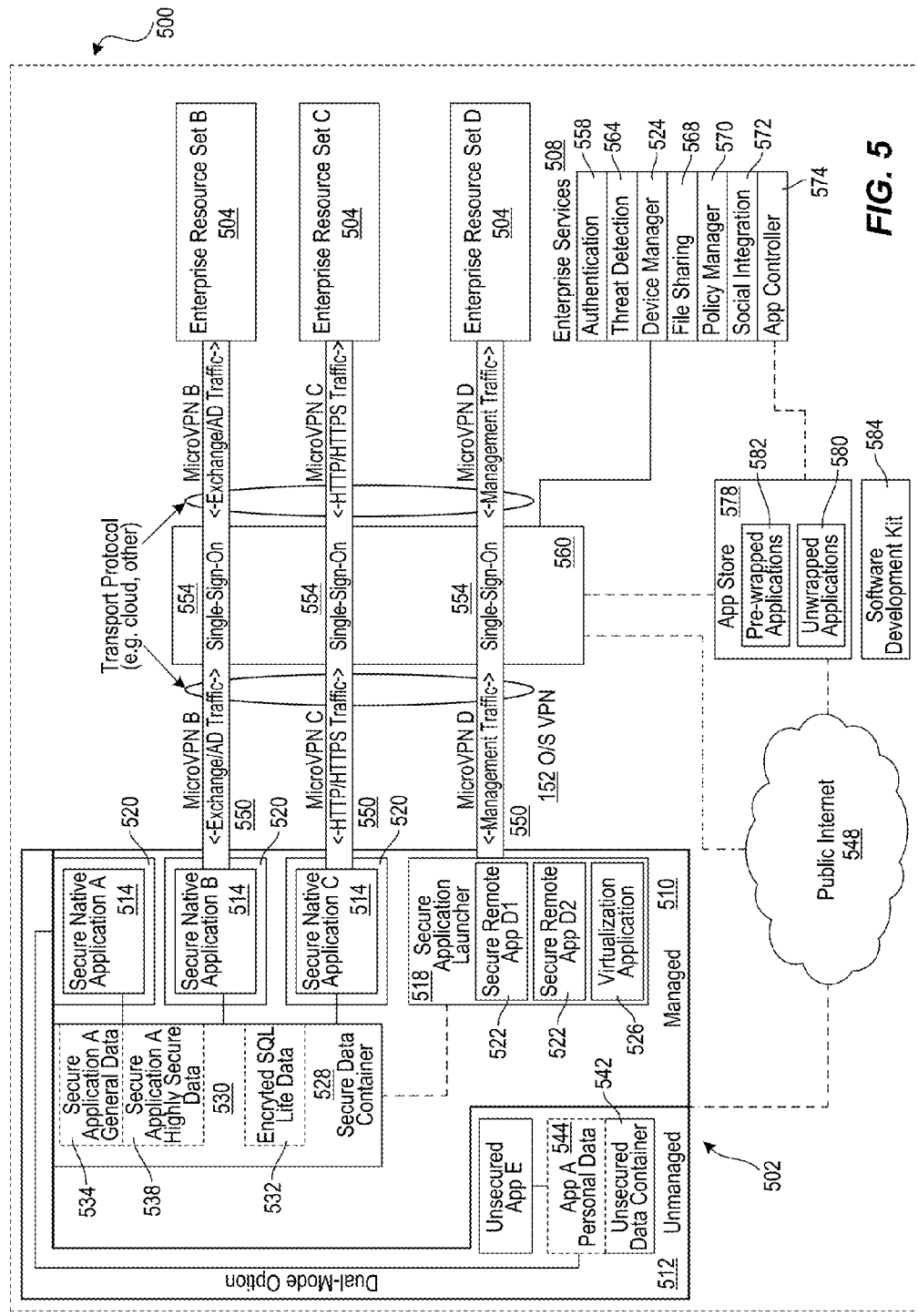
FIG. 5 depicts an illustrative enterprise mobility management system that may be used in accordance with one or more illustrative aspects described herein.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device may run an iOS operating system, Android operating system, and/or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device or a managed device.

In some embodiments, the operating system of the mobile device may be separated into a managed partition 510 and an unmanaged partition 512. The managed partition 510 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections (also referred to at microVPN or application-specific VPN) may be specific to particular applications 550, particular devices, particular secured areas on the mobile device, and the like (e.g., 552). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use user interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
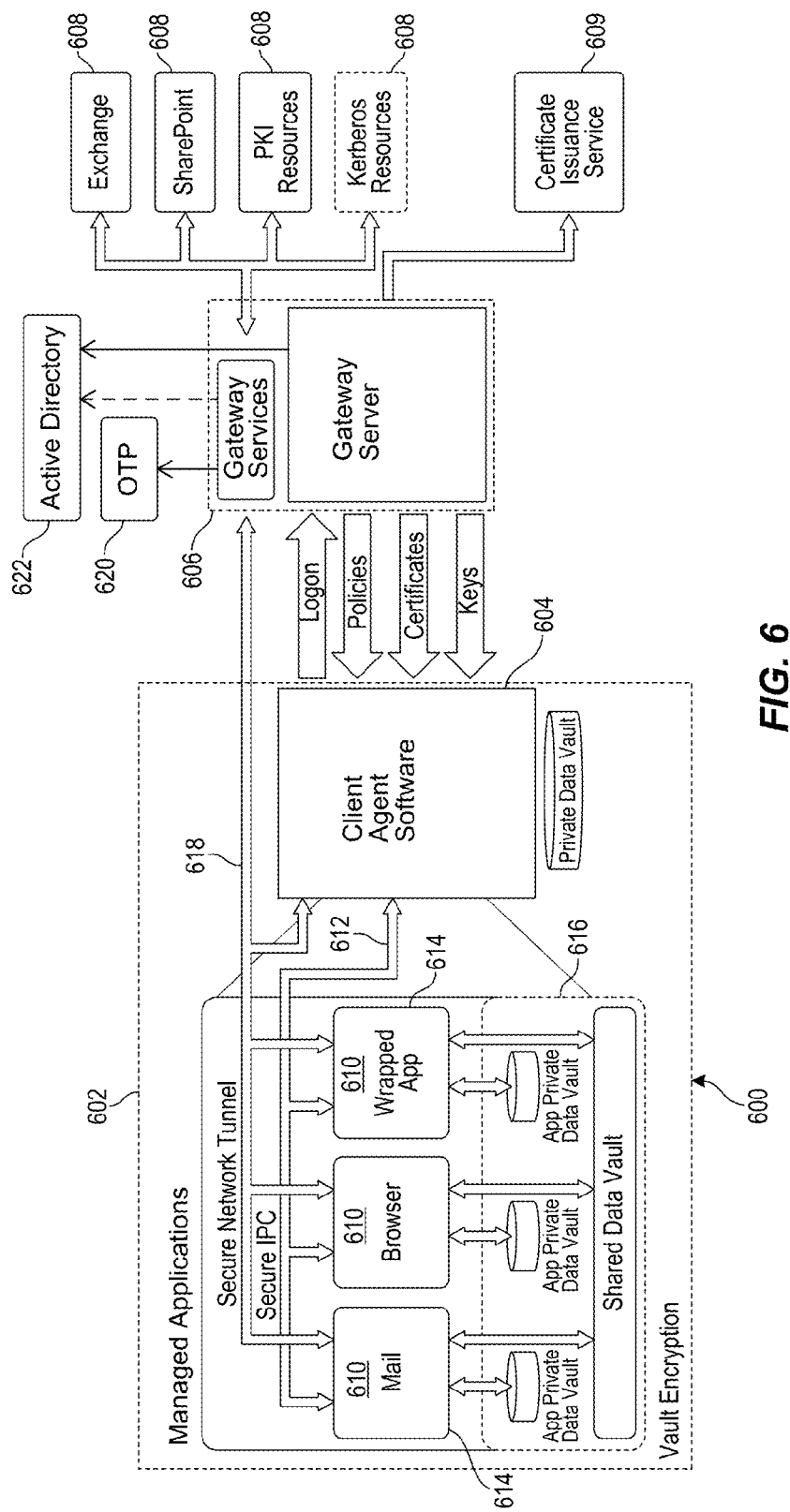
FIG. 6 depicts another illustrative enterprise mobility management system that may be used in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled/managed mobile device 602 with a client agent 604, which interacts with gateway server 606 (which includes access gateway and application controller functionality) to access various enterprise resources 608 and services 609 such as Exchange, Sharepoint, PKI Resources, Kerberos Resources, and Certificate Issuance Service, as shown on the right hand side above. Although not specifically shown, the mobile device 602 may also interact with an application store for the selection and downloading of applications.

The client agent 604 acts as the UI (user interface) intermediary for Windows apps/desktops hosted in an Enterprise data center, which are accessed using a display remoting protocol, such as but not limited to the ICA protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and the application management framework (AMF) of this architecture act to provide policy driven management capabilities and features such as connectivity and SSO (single sign on) to enterprise resources/services 608. The client agent 604 handles primary user authentication to the enterprise, normally to the access gateway (AG) with SSO to other gateway server components. The client agent 604 obtains policies from gateway server 606 to control the behavior of the AMF managed applications 610 on the mobile device 602. In some alternative embodiments, one or more of the native applications (which may, e.g., be included in the managed applications 610) may provide installation and/or management functionalities with receiving commands from and/or otherwise interacting with the client agent 604.

In some embodiments, client agent 604 might function solely as a policy agent on the mobile device, and a separate client agent may provide receiver and/or virtualization functions (e.g., using the display remoting protocol discussed above). In such a split-functionality implementation, the client agent 604 may, for example, support installation and/or management of native applications, but might not provide receiver and/or virtualization functions, which may instead be performed and/or provided by a different client agent running on the mobile device.

The secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606. Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through gateway server 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The mail and browser managed applications 610 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256-bit encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want the enterprise application store to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via a micro VPN feature). For example, an email application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Client certificate support on iOS may rely on importing a PKCS 12 BLOB (Binary Large Object) into the iOS keychain in each managed application for each period of use. Client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP negotiate authentication challenges. The limited support feature relates to constrained delegation in AGEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of the enterprise application store and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing a native desktop (e.g., on a client device, such as a mobile device) using cloud-synchronized data, which may include data that has been mined (e.g., extracted, analyzed, and/or selectively stored) from another desktop remote from the native desktop provided on the mobile device. In the discussion below, various examples illustrating how data can be mined from a remote desktop, synchronized with a cloud-based data storage platform, and used in providing a native desktop on a mobile device in accordance with one or more embodiments will be provided. By implementing these and/or other features, the information that a user might be most likely to need and/or might be considered most important by the user may be cached and/or otherwise stored locally on their mobile device as a result of the synchronization, and this, in turn, may enable the information to be presented in ways that are customized and/or familiar to the user, even in situations where a network connection is unavailable to the mobile device. For example, locally cached information (which may have been created on the remote desktop, but obtained by the mobile device during the synchronization) may be presented in a native desktop, using native viewing applications, on the mobile device, regardless of whether a network connection is available to the mobile device.

Figure 7:
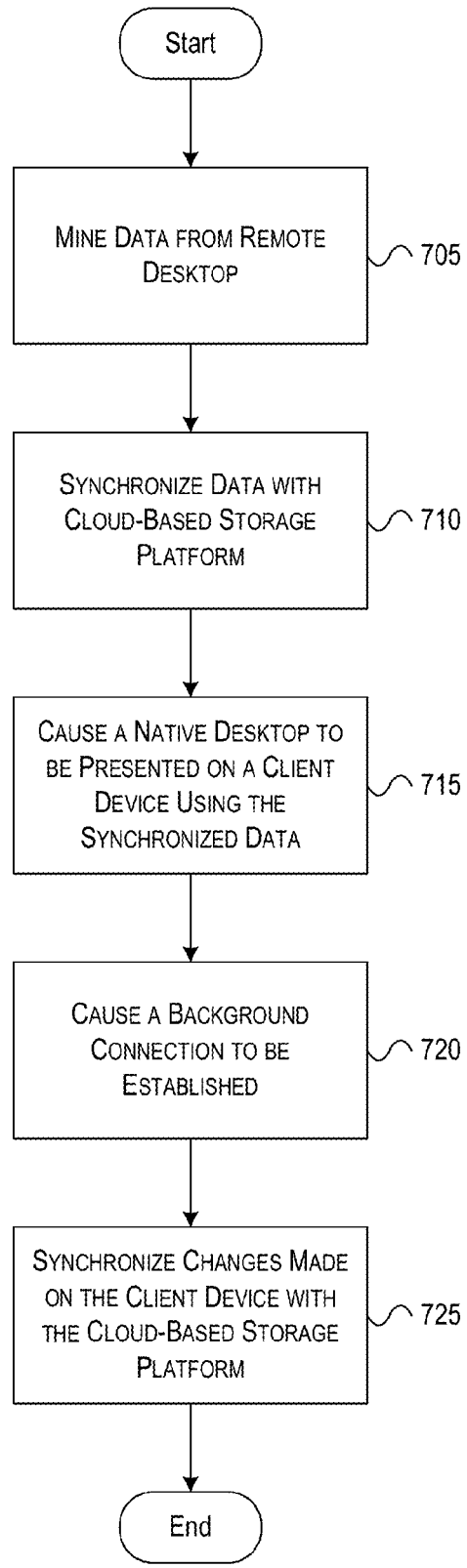
FIG. 7 depicts a flowchart that illustrates a method of providing a native desktop using cloud-synchronized data according to one or more illustrative aspects described herein.

FIG. 7 depicts a flowchart that illustrates a method of providing a native desktop using cloud-synchronized data according to one or more illustrative aspects described herein. In one or more embodiments, the method illustrated in FIG. 7 and/or one or more steps thereof may be performed by a computing device (e.g., generic computing device 201). For example, the method illustrated in FIG. 7 may, in some instances, be performed by a desktop management service that is executed on and/or otherwise provided by one or more computing devices, such as one or more virtualization servers. An example of such a desktop management service will be discussed in further detail below. In other instances, the method illustrated in FIG. 7 may be performed by a virtual machine, a hypervisor, and/or the like. In still other instances, the method illustrated in FIG. 7 and/or one or more steps thereof may, in some instances, be performed by a mobile device (which may implement one or more aspects of a computing device, such as generic computing device 201). In other embodiments, the method illustrated in FIG. 7 and/or one or more steps thereof may be embodied in computer-executable instructions that are stored in a computer-readable medium, such as a non-transitory computer-readable memory.

In step 705, data may be mined from a remote desktop. For example, the remote desktop may be an aggregation of applications, documents, and personalized settings, which may be provided via and/or otherwise associated with a particular operating system and/or a particular instance of an operating system. In mining data from such a remote desktop, any and/or all of this information may be identified, collected, and/or otherwise extracted from the desktop, analyzed to determine whether or not various portions of the extracted data should be stored (e.g., for purposes of synchronization), and, for the one or more portions of the extracted data that are selected for storage (e.g., based on this analysis), stored on another system or server (e.g., to facilitate the synchronization discussed in greater detail below). In some instances, data may be extracted, analyzed, and/or selectively stored from a remote desktop (which may also be referred to as a "source" desktop in some instances) by an agent or other application (e.g., a plug-in, script, etc.) running on the source desktop that is configured to extract, analyze, and selectively store various information from the desktop (including application shortcuts, documents, settings, and/or other types of information, as discussed below) and synchronize this information with a cloud-based data platform (as also discussed below). In other instances, data may be extracted, analyzed, and/or selectively stored from the source desktop by a service (e.g., a desktop management service) or other application that is executed on one or more virtualization servers (which may, e.g., provide the source desktop) and/or one or more other machines, including a virtual machine and/or a hypervisor being executed on a server. For example, data may be extracted, analyzed, and/or selectively stored from the source desktop by profile management software being executed on such a machine, and the profile management software may be configured to pull user information from a network share that may include information associated with the user's network profile. Such profile management software may be part of a desktop management service in some instances, while in other instances, the profile management software may provide a desktop management service, such as the desktop management service discussed in greater detail below.

In some instances, the data that is extracted, analyzed, and/or selectively stored may include one or more application shortcuts, one or more documents, one or more registry keys, one or more personalization settings, or one or more layout settings. The application shortcuts and documents may, for instance, include recently accessed and/or used applications and documents, as well as other applications and documents that may be present on and/or accessible via various menus and/or other elements included in the desktop. Additionally, the registry keys, personalization settings, and layout settings may define various preferences and/or other settings that control and/or affect a number of different aspects of the desktop. For example, the personalization settings may include a custom spell-check dictionary that is used by one or more applications (e.g., a word processing application, an email application, an instant messaging application, etc.) included in the desktop. As another example, the personalization settings may include bookmarks for the user's favorite websites and/or network folders.

In some instances, the remote desktop may be associated with a first operating system and a native desktop (which may, e.g., be presented on the client device, as discussed below) may be associated with a second operating system different from the first operating system. For example, the remote desktop may be a WINDOWS desktop (which may, e.g., be frequently accessed by the user on a work computer), and the native desktop may be an iOS or ANDROID desktop (which may, e.g., be presented on the user's mobile device, as discussed below).

In step 710, the data may be synchronized with a cloud-based data storage platform. For example, in step 710, the data (which, e.g., was extracted, analyzed, and/or selectively stored in step 705) may be uploaded to and/or otherwise exchanged with a cloud-based data storage platform, such as SHAREFILE by Citrix Systems. The agent, application, or service (e.g., the desktop management service) may, for instance, synchronize the extracted, analyzed, and/or selectively stored data with the cloud-based storage platform and/or cause such synchronization to occur (e.g., by exchanging data with the cloud-based storage platform and/or causing such data to be exchanged with the cloud-based storage platform). As illustrated below, this synchronization may enable other devices and/or systems to obtain the data (e.g., by connecting to and/or downloading the data from the cloud-based data storage platform).

In some embodiments, in addition to and/or instead of using the cloud-based data storage platform to synchronize the extracted, analyzed, and/or selectively stored data with a mobile device (e.g., as discussed below), additional and/or alternative synchronization techniques and/or services may be utilized. For example, in some instances, data mined from a remote desktop may be synchronized with a mobile device over an ICA channel and subsequently cached on the mobile device for use in presenting a native desktop (e.g., as discussed below). Additional and alternative ways in which data may be synchronized and/or cached on the mobile device will be discussed in greater detail below.

In step 715, a native desktop may be caused to be presented on a client device (which may, e.g., be a mobile device) using the synchronized data. Such a native desktop may, for instance, comprise a natively-rendered desktop that is managed by receiver software executing on the mobile device, and the synchronized data may be locally cached on the mobile device and used in rendering the native desktop and/or providing access to the applications, documents, and/or other information that were extracted, analyzed, and/or selectively stored from the remote desktop. For example, if the remote desktop included a number of documents, application shortcuts, and a certain desktop background picture, the native desktop also may include the same documents, application shortcuts, and desktop background picture (e.g., as a result of using the synchronized data obtained from the cloud-based data storage platform). Additionally, and as discussed in greater detail below, the user of the mobile device may be able to interact with these documents and/or other files using native viewing applications (e.g., a native document viewing application, a native word processing application, etc.) on the mobile device (if, e.g., such applications are available) and/or using virtualized, remoted applications (if, e.g., native viewing applications are not available).

In instances in which the method illustrated in FIG. 7 is performed by a desktop management service (which may, e.g., be executed on one or more virtualization servers providing the remote/source desktop), such a desktop management service may, for example, cause the native desktop to be presented on the mobile device by configuring the mobile device to access the cloud-based storage platform to download, store, and/or maintain the synchronized data on the mobile device. In addition, in causing the native desktop to be presented on the mobile device, the desktop management service may further configure the mobile device to use the synchronized data in presenting a desktop to the user (e.g., in response to receiving a request to view and/or interact with a native desktop). In configuring the mobile device in these ways, the desktop management service may, for instance, establish and/or modify one or more settings of the mobile device and/or of one or more software applications that may be executed on the mobile device. For example, in configuring the mobile device, the desktop management service may establish and/or modify one or more settings of a receiver application that is installed on and/or otherwise configured to run on the mobile device, and these settings may enable and/or cause the receiver application to access the cloud-based storage platform to obtain and/or locally cache the synchronized data maintained by the cloud-based storage platform (e.g., on demand when a user requests to view the desktop, periodically on a schedule, etc.). In particular, in addition to mined data being synchronized between the remote desktop and the cloud-storage platform, the data also may be synchronized between the cloud storage platform and one or more mobile devices linked to the particular user of the remote desktop. Such data may, for instance, be downloaded by the mobile device on demand (e.g., when a user opens or switches to a receiver application on the mobile device) and/or may be fed to the mobile device periodically (e.g., on a schedule, such as hourly, daily, etc.). In some instances, as changes are made to synchronized data on one device or desktop, the cloud-storage platform and/or the desktop management service may push changes to other devices (e.g., as connections are available and/or can be established) so that all synchronized devices can present an up-to-date version of the synchronized data in a native desktop in accordance with various aspects of the disclosure.

In one or more embodiments, the native desktop that is presented on the mobile device (e.g., in step 715) may depend on the type of device being used by the user and/or the operating system running on the device. For example, if the mobile device is running an iOS operating system, then the native desktop that is presented on the mobile device may have certain features such that the look and feel of the native desktop is consistent and/or seamless with the iOS operating system and/or other applications being executed on the device. Similarly, if the mobile device is running an ANDROID operating system, then the native desktop that is presented on the mobile device may have certain features such that the look and feel of the native desktop is consistent and/or seamless with the ANDROID operating system and/or other applications being executed on the device. In other instances, a native desktop may be presented on a mobile device based on a different operating system (e.g., other than iOS and ANDROID) being used with the device. Additionally, in some arrangements, the device on which the native desktop is presented might not be a mobile device; rather, the device might be a tethered device, a wired computer device, and/or the like.

For example, in some instances, causing the native desktop to be presented on the mobile device may include causing at least some of the synchronized data to be presented using at least one native application of the native desktop. For instance, if the synchronized data includes a MICROSOFT WORD document and the native desktop presented on the mobile device is an APPLE iOS desktop, then causing the synchronized data to be presented may include presenting the document in APPLE PAGES or in another word processing application that is natively executed and/or rendered on the mobile device.

In other instances, causing the native desktop to be presented on the mobile device may include causing a remoted application to be presented on the mobile device if a native viewing application for at least some of the synchronized data is unavailable. For instance, if the synchronized data includes a MICROSOFT WORD document, as in the example above, but the native desktop and/or the mobile device does not include an application that is capable of displayed and/or editing the document, a remotely-executed application may be switched to and/or otherwise presented on the mobile device to enable access to and/or editing of the document (if, e.g., a network connection is available to the mobile device). Thus, in this example, a remoted session of MICROSOFT WORD may be displayed and/or otherwise presented on the mobile device. This remoted session may, for instance, be a virtualization of the MICROSOFT WORD application provided by a remote server (e.g., rather than a natively executed and/or rendered application) using one or more aspects of the virtualization techniques discussed above. In this way, a remotely-executed application (e.g., from a WINDOWS desktop) can be invoked on the native desktop, thereby allowing a user to seamlessly and transparently switch between native applications and remote applications so as to provide an enhanced, seamless user experience.

In some embodiments, the native desktop may be presented on the mobile device using a receiver application that is installed on and/or executed by the mobile device. In other instances, any desired software application(s) may be used in presenting the native desktop, including one or more applications that may be downloaded and/or installed by the user from an application store.

In step 720, a background connection may be caused to be established between the mobile device and a second device (such as a virtual machine or hypervisor) that is configured to provide the remote desktop. For example, where the remote desktop is a remote WINDOWS desktop and the native desktop is an iOS or ANDROID desktop presented on the mobile device, the mobile device (and/or the receiver software being executed thereon) may establish a connection to the remote WINDOWS desktop after the native desktop is initially rendered, displayed, and/or otherwise presented on the mobile device. This may, for instance, reduce the amount of time that the user of the mobile device may have to wait to access and/or view their documents and applications (e.g., relative to the amount of time that the user might have to wait if the native desktop were unavailable and the user had to wait for the remote desktop to be loaded and displayed). In other words, by establishing the connection to the remote desktop in the background after the native desktop is initially presented, the user may perceive that they have instantaneous access to their documents, applications, and other data.

In step 725, changes made to the synchronized data on the client device may be synchronized with the cloud-based data storage platform. For example, if at least some of the synchronized data is changed on the mobile device (e.g., as a result of the user editing and/or otherwise modifying at least some of the data in a native viewing application and/or in the native desktop), then any and/or all of these changes may be synchronized with the cloud-based data storage platform so that these changes will be reflected on the remote desktop (e.g., the remote WINDOWS desktop). For instance, if the user utilizes a native word processing application on the mobile device to edit a document included in the native desktop, the user's saved changes to the document may be synchronized with the cloud-based data storage platform so that when the user later accesses the document on the remote desktop, the changes made to the document on the mobile device are reflected.

In some embodiments, the mined and synchronized data (e.g., maintained by the cloud-based data storage platform) and/or the locally-cached copies of this data (e.g., maintained on the mobile device) may be secured with a number of different security measures to enable network administrators and/or other users to control access to and/or editing of the data. For example, in some instances, location-based security measures may be configured and/or implemented by a network administrator such that a mobile device user may be able to access, open, view, and/or edit locally-cached data while at one or more particular locations (e.g., at a job site, in a particular office building, etc.), but might otherwise be restricted from accessing, opening, viewing, and/or editing such data while at other locations (e.g., at the mobile device user's home). Similar restrictions may, for example, be configured and/or implemented to control and/or limit what applications can be executed in and/or provided via the native desktop. Additionally or alternatively, other settings may be configured and/or implemented that control and/or limit the execution and/or inclusion of applications in the native desktop to one or more particular, secured mobile applications (e.g., rather than any applications that might otherwise be installed on the mobile device from an application store).

In instances in which the mined and synchronized data (e.g., maintained by the cloud-based data storage platform) and/or the locally-cached copies of this data (e.g., maintained on the client device) are secured, one or more policies may be defined, applied, enforced, and/or otherwise used to control how the data is accessed and/or used. Such policies may, for instance, define permitted and/or prohibited uses of the data depending on a current context of the client device, which may be evaluated in terms of state information associated with the client device. Such state information may, for example, include information about what applications and/or files are installed on and/or used on the client device, where the client device is located, and/or what network(s) the client device is connected to. This state information may, for instance, be monitored by a management agent running on the client device, and in addition to monitoring this state information, the management agent may also enforce policy compliance (e.g., by selectively enabling and/or disabling one or more functions of the client device, selectively enabling and/or disabling one or more functions of applications loaded on the client device, selectively enabling and/or disabling access to one or more specific information resources on client device, etc.).

In some embodiments, one or more policies may be configured to control behavior of the native desktop. In particular, the one or more policies may, for instance, be configured to control, secure, and/or otherwise affect the behavior of the native desktop that is presented on the client device based on state information associated with the client device. For example, at least one policy of the one or more policies that may be applied, enforced, and/or otherwise used on the client device may be configured to selectively disable and/or enable the client device's ability to locally cache and/or otherwise store the mined and synchronized data depending on state information associated with the client device. As another example, at least one policy of the one or more policies that may be applied, enforced, and/or otherwise used on the client device may be configured to control whether authentication is required to access one or more cached files on the client device depending on state information associated with the client device. As another example, at least one policy of the one or more policies that may be applied, enforced, and/or otherwise used on the client device may be configured to control whether the native desktop is permitted to use one or more native editors and/or other native applications in viewing and/or editing the mined and synchronized data depending on state information associated with the client device. As another example, at least one policy of the one or more policies that may be applied, enforced, and/or otherwise used on the client device may be configured to control whether the native desktop is permitted to use one or more remoted applications in viewing and/or editing the mined and synchronized data depending on state information associated with the client device. As another example, at least one policy of the one or more policies that may be applied, enforced, and/or otherwise used on the client device may be configured to selectively permit and/or prohibit one or more specific applications on the client device from viewing, editing, and/or otherwise accessing the mined and synchronized data depending on state information associated with the client device.

Additional details about how a native desktop on a mobile device may be secured in some embodiments, as well as additional computing system architectures and computing environments that may be used in some embodiments, are discussed in greater detail in U.S. Patent Application Ser. No. 61/806,577, entitled "SYSTEMS AND METHODS FOR ENTERPRISE MOBILITY MANAGEMENT", and filed Mar. 29, 2013, which is hereby incorporated by reference in its entirety for all purposes.

FIGS. 8-12 depict example user interfaces that may be displayed on a mobile device in providing a native desktop using cloud-synchronized data according to one or more illustrative aspects described herein.

Figure 8:
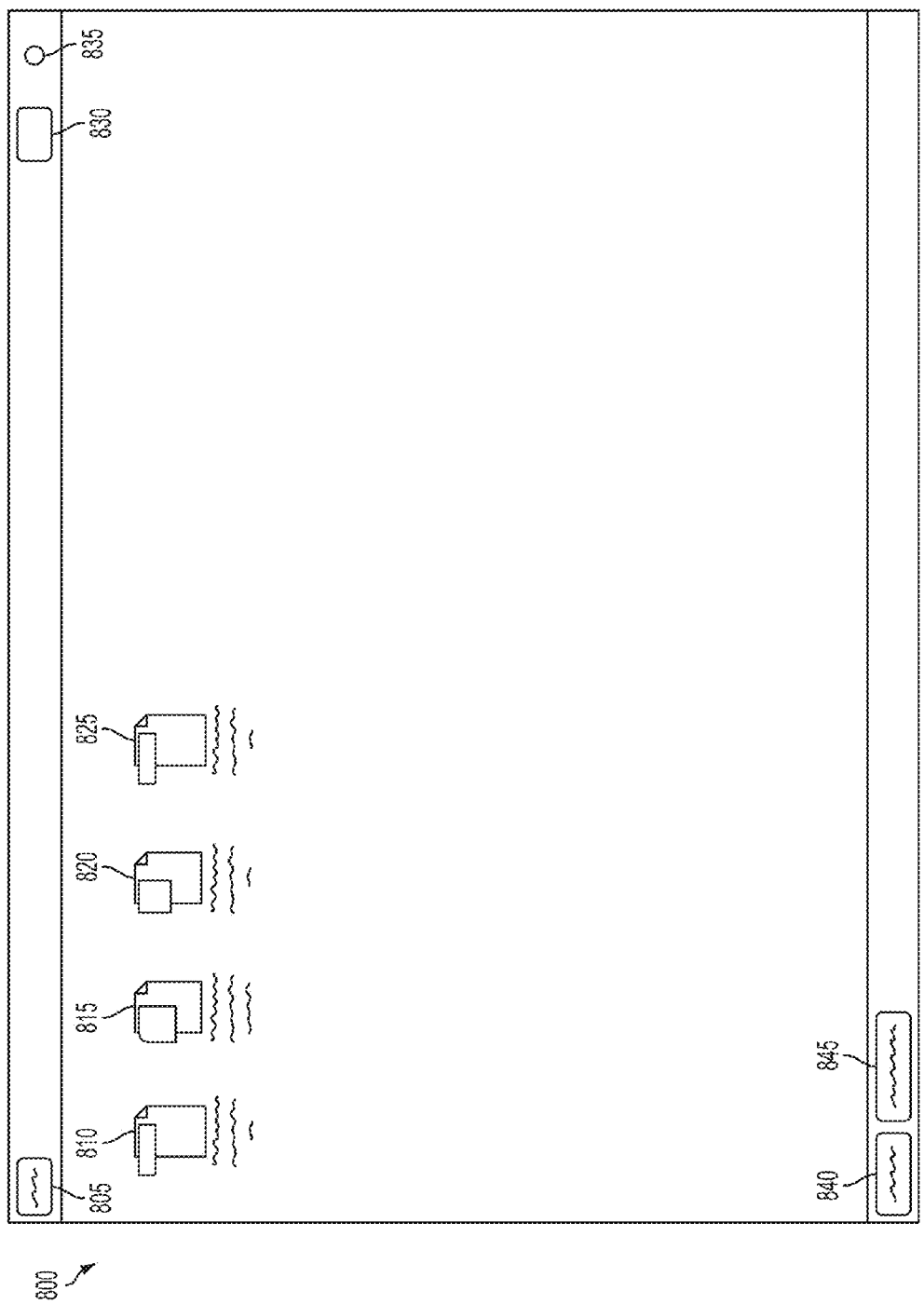
FIGS. 8-12 depict example user interfaces that may be displayed on a mobile device in providing a native desktop using cloud-synchronized data according to one or more illustrative aspects described herein.

FIG. 8 illustrates an example of a user interface that includes a native desktop 800 that may be natively rendered and displayed on a mobile device (e.g., a smart phone, a tablet computer, any other type of mobile computing device, etc.). As seen in FIG. 8, native desktop 800 may include a start button 805, which may be a user-selectable button that enables a user to view a menu of programs, documents, and other files that may be accessed and/or displayed. In one or more embodiments, the contents of the menu may reflect the contents of a start menu included in a remote desktop (e.g., a remote WINDOWS desktop) that has been extracted, analyzed, and/or selectively stored and subsequently synchronized as in the examples discussed above. In addition, native desktop 800 may include one or more documents 810, 815, 820, and 825 that likewise may reflect the documents included in the remote desktop (e.g., as a result of the synchronization performed above).

In one or more embodiments, native desktop 800 also may include a number of other buttons and indicators, including a remote desktop button 830 (which may be a user-selectable button that enables the user to view the remote desktop with which the native desktop is synchronized), a connection status indicator 835 (which may indicate whether a background connection to the remote desktop has been established), a view desktop button 840 (which may be a user-selectable button that enables the user to view the desktop if another window is displayed), and an application switch button 845 (which may be a user-selectable button that enables the user to switch the display between different applications and/or files).

Figure 9:
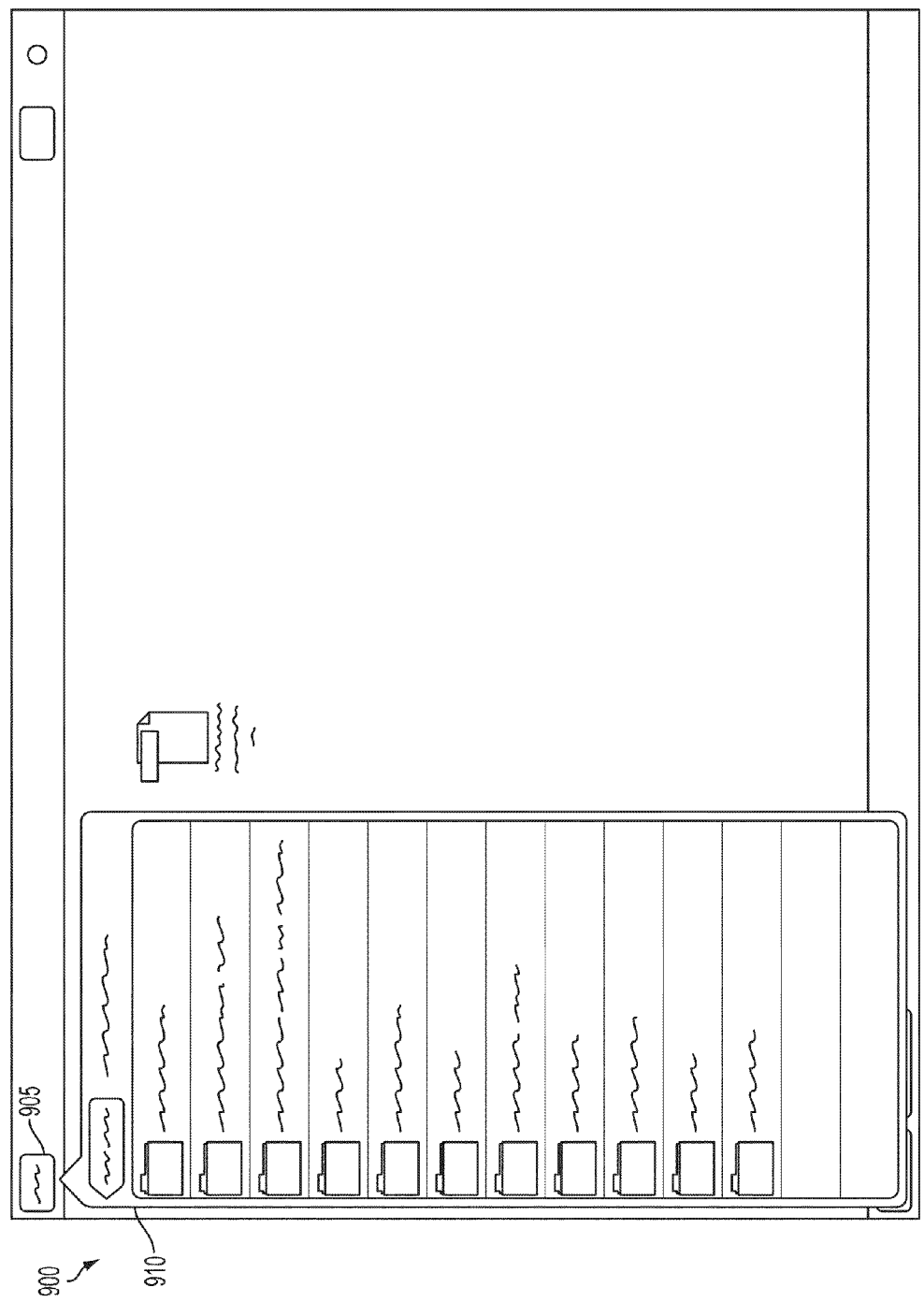

FIG. 9 illustrates another example of a native desktop 900. As seen in FIG. 9, based on start button 905 being selected, a menu 910 may be displayed that includes various applications, documents, and/or other files. In one or more embodiments, the contents of the menu 910 may correspond to the contents of a similar menu included in the remote desktop with which the native desktop 900 is synchronized. For example, using the data mining and synchronization techniques discussed above, the contents of the user's start menu in the remote desktop (which may, e.g., be a remote WINDOWS desktop) may be presented in the native desktop 900 to allow the user to access and/or view the applications, documents, and/or other files included in the start menu in a familiar manner on the mobile device.

Figure 10:
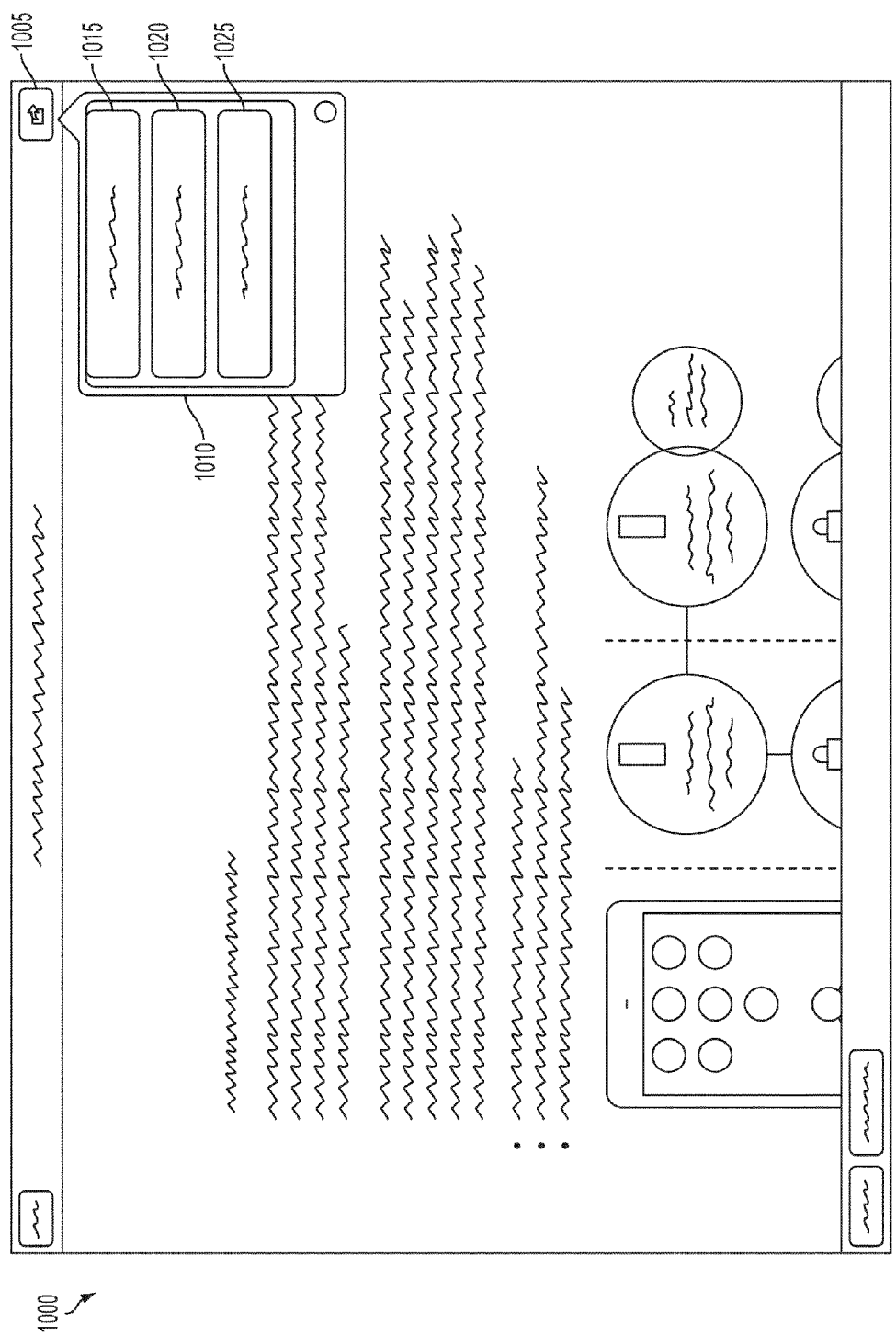

FIG. 10 illustrates an example user interface 1000 in which a native viewing application is displayed. As seen in FIG. 10, user interface 1000 may include the contents of a document that has been synchronized with the native desktop on the mobile device (e.g., using the data mining and synchronization techniques discussed above). In addition, user interface 1000 may include a menu button 1005 that, when selected, may cause a menu 1010 to be displayed. Menu 1010 may, in turn, include a number of options 1015, 1020, 1025 that allow the user of the mobile device to perform various actions with respect to the document. For example, menu 1010 may include an open app option 1015 that, when selected, may cause the mobile device to switch from displaying the document in the native viewing application to presenting the document in a remoted application. Additionally, menu 1010 may include a send file option 1020 that may allow the user to send the document to one or more recipients, as well as a copy link option 1025 that may allow the user to share a link to the document with one or more recipients.

Figure 11:
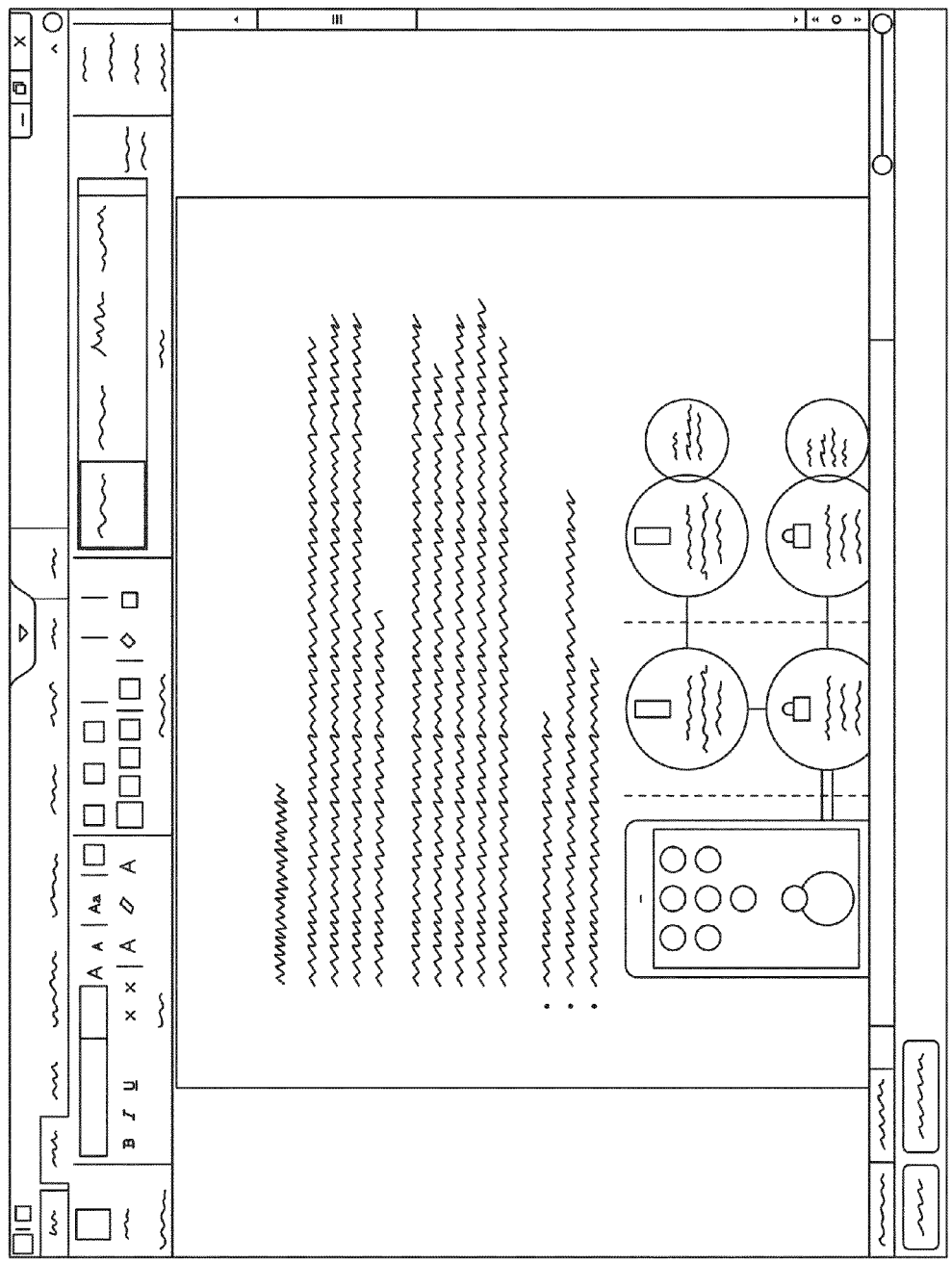

FIG. 11 illustrates an example user interface 1100 in which a document is presented in a remoted application. In particular, user interface 1100 may be displayed in response to the user selecting open app option 1015 of menu 1010 in the previous example. Based on this selection, the mobile device may present the document a remoted application, as seen in FIG. 11.

Figure 12:
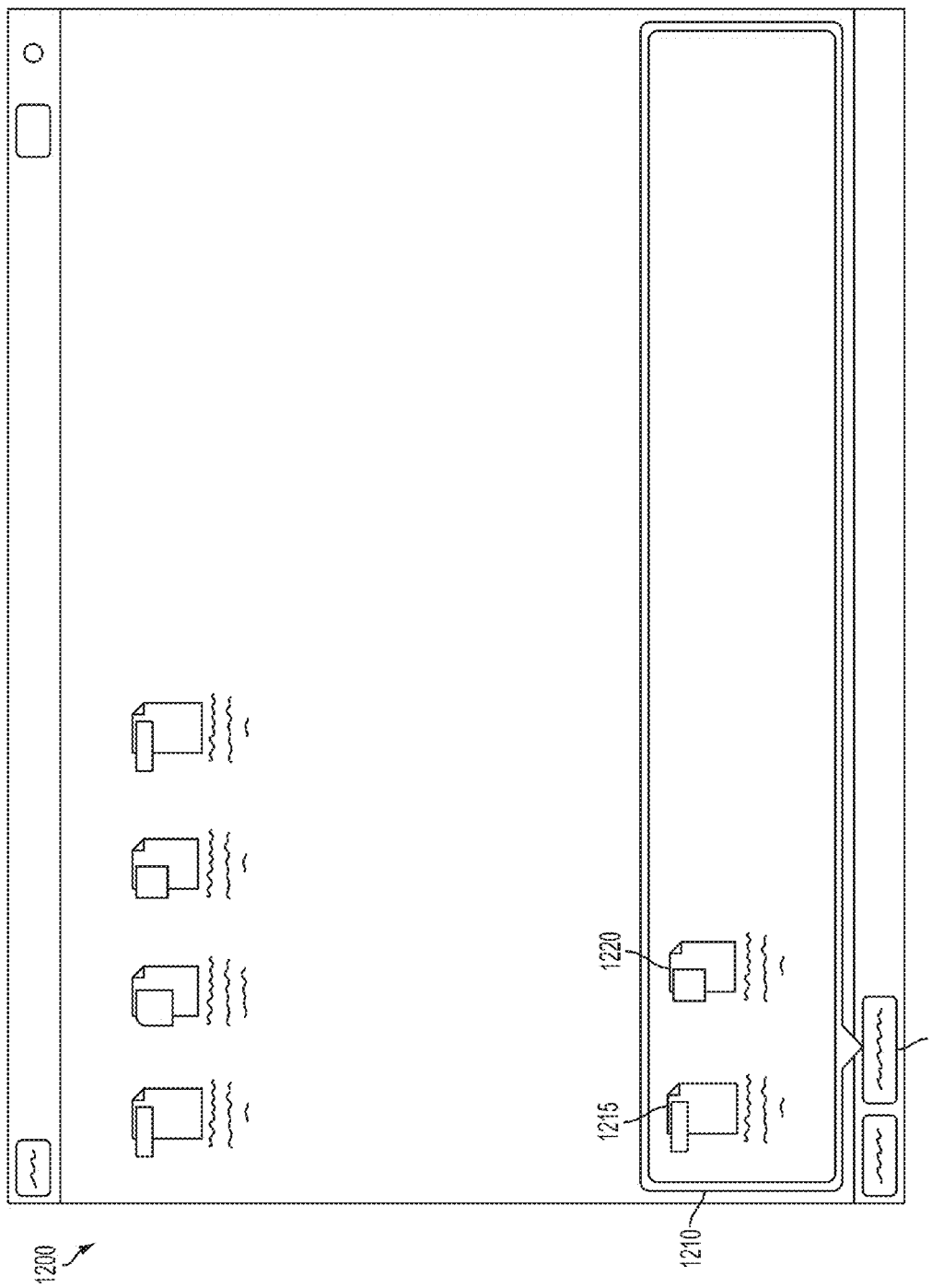

FIG. 12 illustrates another example of a native desktop 1200. As seen in FIG. 12, based on the user of the mobile device selecting app switch button 1205, an application switching menu 1210 may be displayed. In addition, application switching menu 1210 may include a number of icons 1215 and 1220, and each of these icons may correspond to a different document that can be accessed via the native desktop 1200. In some instances, all of the documents and/or application shortcuts that may be included in the application switching menu 1210 may correspond to documents and/or applications that are locally executed and/or natively rendered on the mobile device. In other instances, some or all of the documents and/or application shortcuts that may be included in the application switching menu 1210 may correspond to documents and/or applications that are remotely executed and simply displayed on the mobile device.

Figure 13:
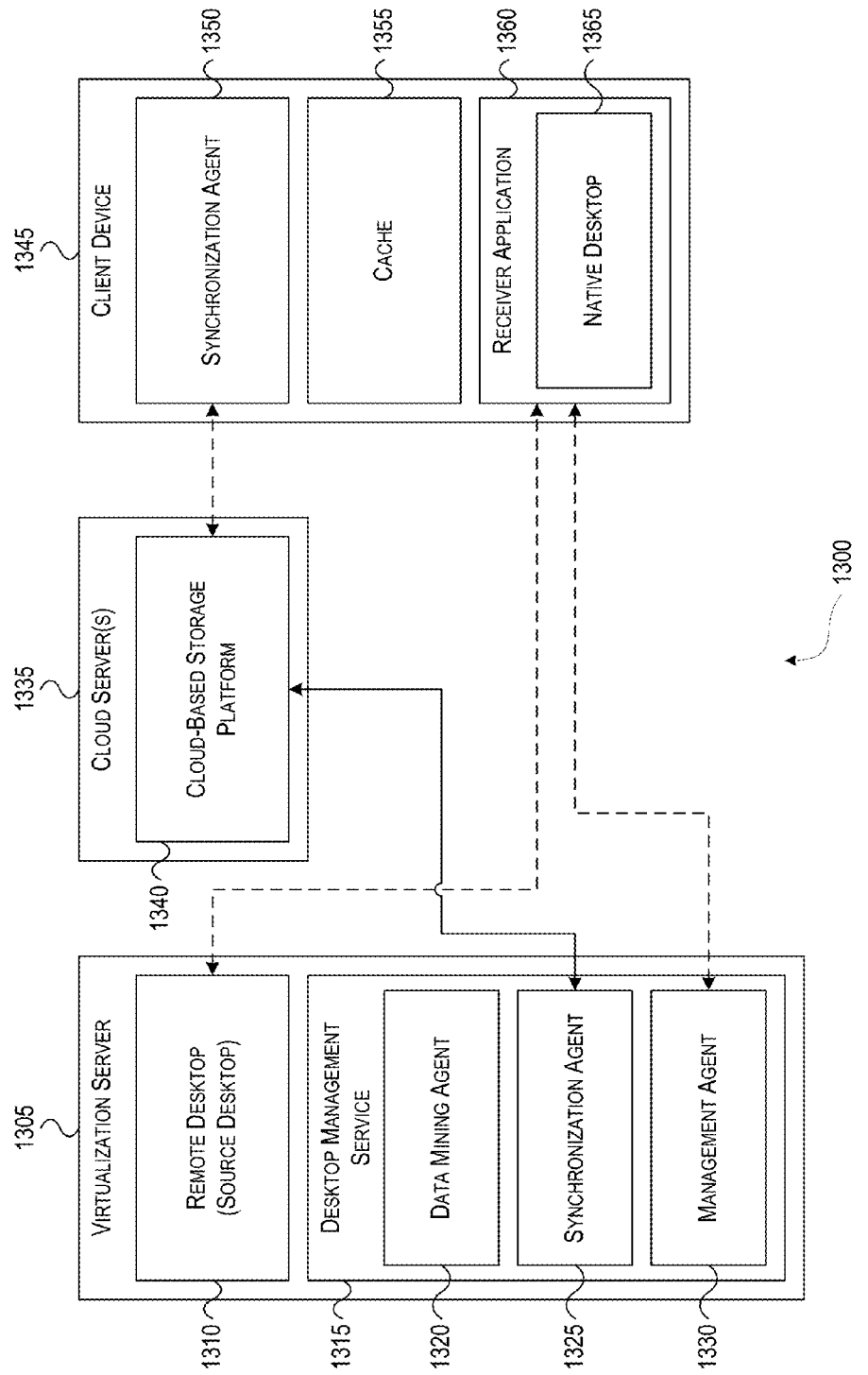
FIG. 13 depicts an example of a system for providing a native desktop using cloud-synchronized data according to one or more illustrative aspects described herein.

FIG. 13 depicts an example of a system 1300 for providing a native desktop using cloud-synchronized data according to one or more illustrative aspects described herein. As seen in FIG. 13, system 1300 may include a virtualization server 1305, one or more cloud servers 1335, and a client device 1345. In some embodiments, system 1300 may include other elements instead of and/or in addition to those discussed here. For example, system 1300 may include multiple virtualization servers and/or multiple client devices.

In one or more arrangements, virtualization server 1305 may implement one or more aspects of generic computing device 201. For example, virtualization server 1305 may include one or more processors, memory, and/or other components that may, for instance, enable virtualization server 1305 to receive, store, and/or execute various instructions. Additionally or alternatively, virtualization server 1305 may implement one or more aspects of virtualization server 301.

In some embodiments, virtualization server 1305 may provide access to and/or store information for one or more virtual desktops, including a remote desktop 1310 that may be accessed and/or used by a user of a mobile device, for example, in accordance with one or more aspects of the disclosure. Virtualization server 1305 also may provide a desktop management service 1315 (which may, e.g., be provided by virtualization server 1305 by storing and/or executing computer-readable instructions that cause the virtualization server 1305 to provide the desktop management service 1315).

In some embodiments, desktop management service 1315 may include various agents that may execute certain tasks and/or provide other functionalities that may facilitate various aspects of the disclosure. For example, desktop management service 1315 may include a data mining agent 1320, a synchronization agent 1325, and a management agent 1330. In other embodiments, desktop management service 1315 may include other agents and/or other elements instead of and/or in addition to those discussed here.

In some arrangements, data mining agent 1320 may identify, collect, and/or extract information from one or more virtual desktops, including remote desktop 1310. In addition, data mining agent 1320 may analyze the identified, collected, and/or extracted information to determine whether such information should be stored for purposed of synchronization. Data mining agent 1320 also may store the portions of the information that are selected for storage based on the analysis. For instance, data mining agent 1320 may locally store any and/or all of this information in one or more databases that are maintained by and/or accessible to virtualization server 1305. In addition, and as discussed above, the types of information that may be collected and/or extracted from a virtual desktop, such as remote desktop 1310, by data mining agent 1320 may include application shortcuts, documents, registry keys, personalization settings, layout settings, and other types of information.

In some arrangements, synchronization agent 1325 may upload information stored by data mining agent 1320 to a cloud-based storage platform, such as cloud-based storage platform 1340. This uploading may, for example, enable other devices and/or other systems to obtain the information stored by data mining agent 1320 for use in presenting a native desktop, in accordance with various aspects of the disclosure. In addition, synchronization agent 1325 may receive information and/or otherwise exchange information with the cloud-based storage platform 1340 to ensure that the information stored by data mining agent 1320 remains up-to-date. In particular, as changes are made to this information on other devices, and as such changes are reflected in the information then stored in the cloud-based storage platform 1340, the changed and/or updated information may be downloaded by synchronization agent 1325 so that any changes made on other systems are reflected in the virtual desktop 1310 provided by virtualization server 1305.

In some arrangements, management agent 1330 may cause a native desktop to be presented on one or more client devices, such as client device 1345. In causing a native desktop to be presented on a client device, management agent 1330 may, for example, configure the client device (and/or one or more software applications loaded on and/or being executed on the client device) to enable the device (and/or the applications on the device) to present a native desktop using the information that may be stored by data mining agent 1320 and/or synchronized with the cloud-based storage platform 1340 by synchronization agent 1325.

In one or more arrangements, the one or more cloud servers 1335 may implement one or more aspects of generic computing device 201. For example, each of the one or more cloud servers 1335 may include one or more processors, memory, and/or other components that may, for instance, enable each server to receive, store, and/or execute various instructions.

In some embodiments, the one or more cloud servers 1335 may provide cloud-based storage platform 1340. For example, the one or more cloud servers 1335 may store data associated with the cloud-based storage platform 1340 and provide other functionalities associated with the cloud-based storage platform 1340, such as authentication, encryption, and other functionalities.

In some embodiments, cloud-based storage platform 1340 may provide data storage, file sharing, and other functionalities to various users, including various enterprise users that may be associated with one or more particular organizations or other entities. In some instances, cloud-based storage platform 1340 may be an enterprise resource, similar to enterprise resources 504, and may be part of an enterprise mobility architecture deployed by an organization or other entity in providing mobile computing services (e.g., to employees, contractors, members, affiliates, authorized users, and/or other entities).

In one or more arrangements, client device 1345 may implement one or more aspects of generic computing device 201. For example, client device 1345 may include one or more processors, memory, and/or other components that may, for instance, enable client device 1345 to receive, store, and/or execute various instructions. In some instances, client device 1345 may be a mobile device, such as a smartphone, tablet computer, or other type of mobile computing device.

In some embodiments, client device 1345 may include and/or provide (e.g., through storage and/or execution of computer-readable instructions) a synchronization agent 1350, a cache 1355, and a receiver application 1360. In some arrangements, synchronization agent 1350 may connect to the one or more cloud servers 1335 and may download information from, upload information to, and/or exchange information with cloud-based storage platform 1340. The information obtained by synchronization agent 1350 from the one or more cloud servers 1335 may thus include information mined from the remote virtual desktop 1310 and/or other information. In addition, synchronization agent 1350 may store the information obtained from cloud-based storage platform 1340 in the local cache 1355 on client device 1345.

In some arrangements, receiver application 1360 may be a software application that is loaded on and/or executed by the client device 1345. Receiver application 1360 may, for instance, provide a native desktop 1365, and in some instances, the native desktop 1365 may be presented by receiver application 1360 using information stored in cache 1355 by synchronization agent 1350 and/or otherwise obtained from remote desktop 1310. By presenting native desktop 1365 using information stored in cache 1355, receiver application 1360 may enable a user of client device 1345 to view and/or interact with native desktop 1365 even in instances where a network connection cannot be established between client device 1345 and virtualization server 1305 and/or the one or more cloud servers 1335. At times when such a network connection can be established, receiver application 1360 also may directly exchange data with remote virtual desktop 1310 in providing native desktop 1365 to a user of client device 1345.

While synchronization agent 1350 is illustrated as a separate element from receiver application 1360 in FIG. 13, synchronization agent 1350 may, in other arrangements, be incorporated into receiver application 1360, such that the receiver application 1360 itself may connect to and/or exchange data with cloud-based storage platform 1340 to synchronize information, including information that may be used by receiver application 1360 in presenting native desktop 1365.

Figure 14:
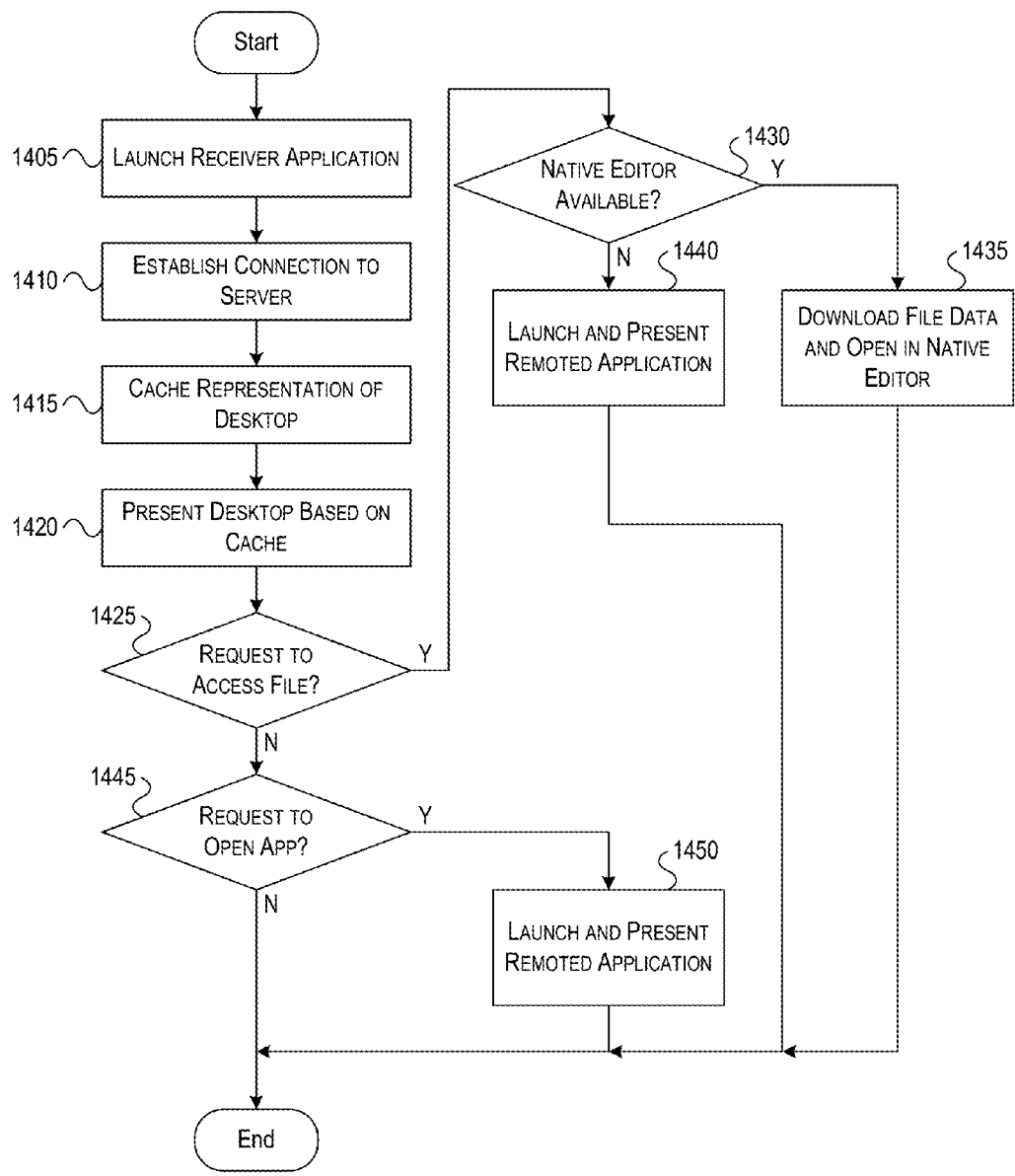
FIGS. 14-16 depict flowcharts that illustrate various methods of presenting a native desktop at a computing device according to one or more illustrative aspects described herein.
Figure 15:
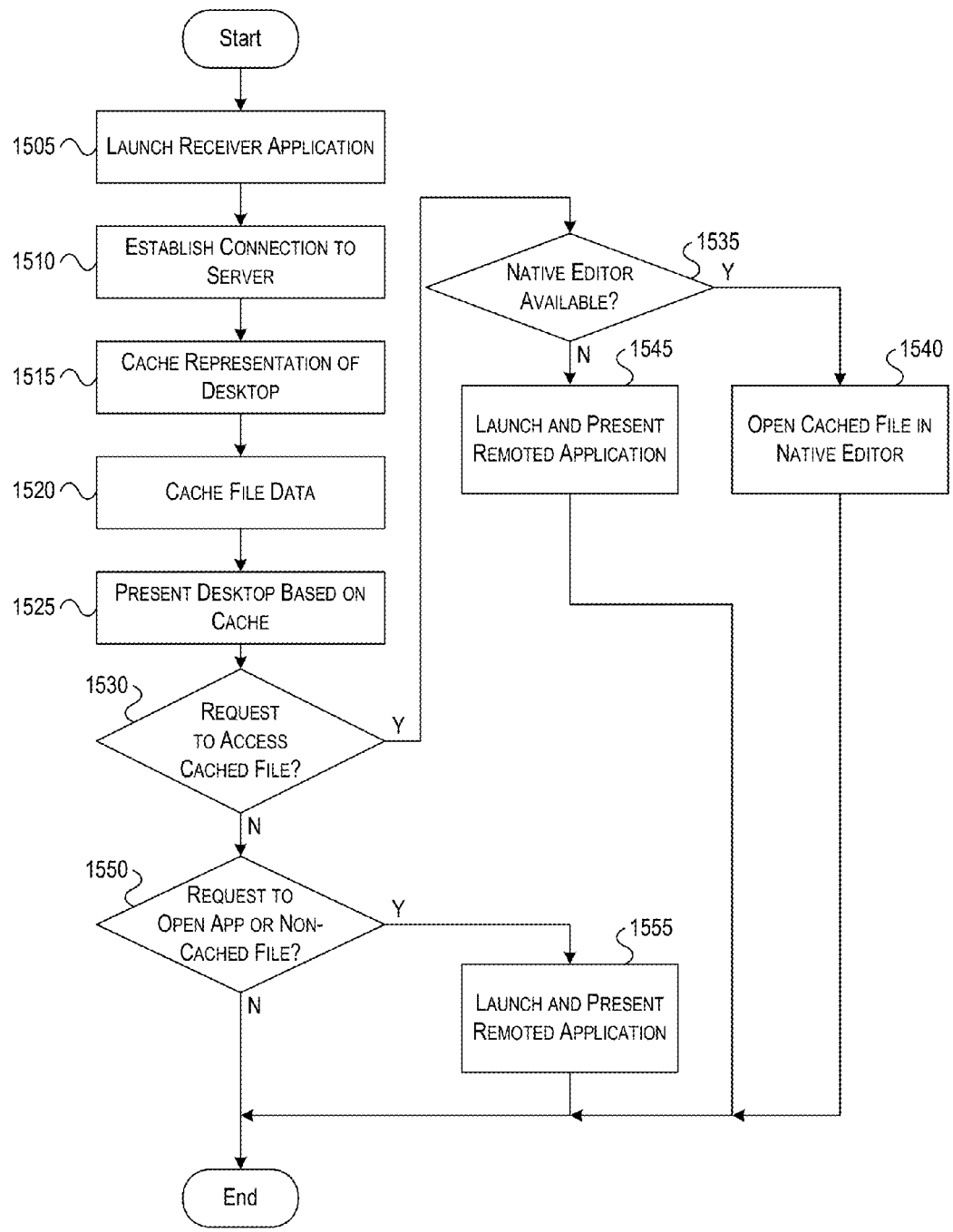
Figure 16:
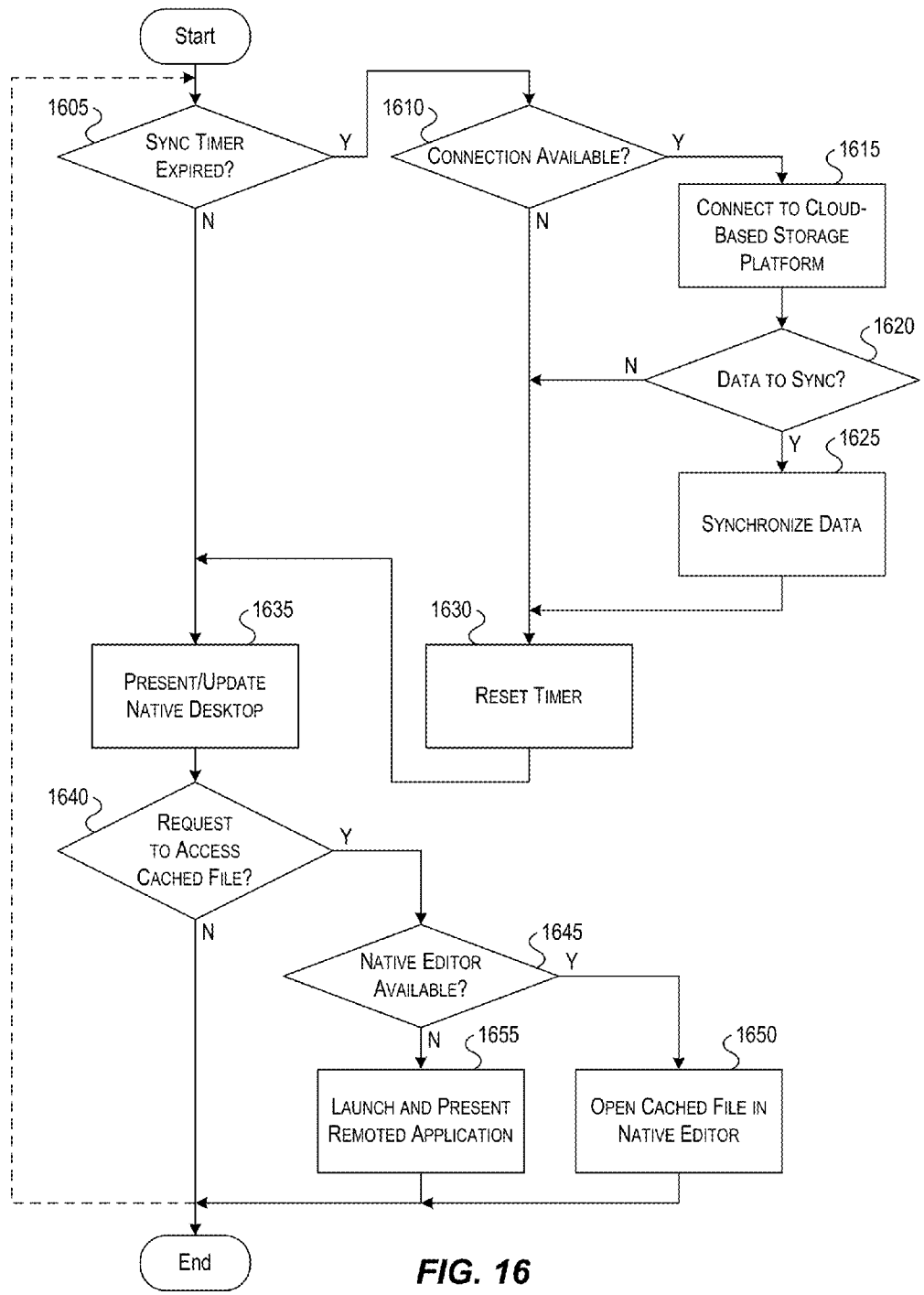

FIGS. 14-16 depict flowcharts that illustrate various methods of presenting a native desktop at a computing device according to one or more illustrative aspects described herein. In particular, the flowcharts shown in FIGS. 14-16 illustrate steps that may be executed by a mobile device in providing a native desktop in different arrangements. For purposes of illustration, these methods shown in these flowcharts will be described in connection with the system architecture shown in FIG. 13. It should be understood, however, that in other embodiments, the methods shown in these flowcharts may be performed in connection with additional and/or alternative system architectures.

In the example method shown in FIG. 14, a mobile device may locally cache a representation of a remote desktop, without caching other aspects of the remote desktop, and subsequently use the locally cached data in presenting a native desktop. In addition, in the example method shown in FIG. 14, the mobile device may locally cache the representation of the remote desktop without the involvement of a cloud-based storage platform.

In particular, the method may begin in step 1405 in which a receiver application may be launched. For example, in step 1405, client device 1345 may launch, open, and/or otherwise initiate execution of receiver application 1360. In some instances, receiver application 1360 may be launched by a synchronization agent 1350 on client device 1345 to cause the receiver application 1360 to connect to and/or exchange data with a remote desktop 1310 (e.g., so as to synchronize data stored in cache 1355). The receiver application 1360 may, for instance, be launched periodically on a schedule, automatically whenever a network connection between the client device 1345 and the virtualization server 1305 is available, and/or based on one or more other criteria.

In step 1410, client device 1345 may establish a connection to virtualization server 1305. In particular, client device 1345 may connect to virtualization server 1305 to extract and store data from remote desktop 1310.

In step 1415, client device 1345 may cache a representation of remote desktop 1310. The representation of the remote desktop (which may, e.g., be cached in step 1415) may include one or more names of files and/or folders included on the remote desktop and/or in one or more menus accessible from the desktop, one or more icons for these files and/or folders, information defining the arrangement and/or layout of icons and/or menus, one or more desktop backgrounds, and/or other meta-data associated with the remote desktop. Any and/or all of this information may be downloaded in step 1415 by client device 1345 over a connection (which may, e.g., be an ICA channel) established between receiver application 1360 and remote desktop 1310. In addition, client device 1345 may store the representation of remote desktop 1310 in cache 1355 even after receiver application 1360 is closed and/or after a connection between client device 1345 and virtualization server 1305 is disconnected.

In step 1420, client device 1345 may present a native desktop based on the representation of remote desktop 1310 cached in step 1415. For example, in step 1420, receiver application 1360 may cause client device 1345 to display a user interface that includes native desktop 1365. In generating the user interface in which native desktop 1365 may be presented and/or displayed, receiver application 1360 and/or client device 1345 may access and/or use information stored in cache 1355, including the cached representation of remote desktop 1310, so that the appearance of native desktop 1365 reflects the appearance of remote desktop 1310.

In step 1425, client device 1345 may determine whether a request to access a file has been received. For example, in step 1425, client device 1345 may determine whether user input corresponding to a request to access a file included in native desktop 1365 has been received. If such a request has been received, then in step 1430, client device 1345 may determine whether a native editor is available on client device 1345 for the requested file. Such a native editor may, for instance, be a software application which is loaded on and/or executable by client device 1345 that allows the file (which, e.g., the user of client device 1345 has requested to access) to be viewed and/or edited.

If a native editor is available (e.g., in step 1430), then in step 1435, client device 1345 may download file data associated with the requested file and subsequently open the file in the native editor. The file data may, for instance, be downloaded by client device 1345 via the previously established connection (which may, e.g., be an ICA channel) to the virtualization server 1305 and remote desktop 1310. If this connection has been disconnected, client device 1345 may attempt to reestablish the connection to virtualization server 1305 and remote desktop 1310. If the connection cannot be established, client device 1345 and/or receiver application 1360 may display an error message. Otherwise, once the connection has been established and the file data has been downloaded, client device 1345 may launch the native editor and/or cause the native editor to open the file data so as to allow the user of client device 1345 to view and/or edit the requested file.

If a native editor is not available (e.g., in step 1430), then in step 1440, client device 1345 may launch and present a remoted application. The remoted application may, for instance, enable a user of the client device 1345 to view and/or edit the requested file, even though a native editor is not available on client device 1345. Such a remoted application may, for example, be provided by virtualization server 1305 (e.g., via the previously established connection between the client device 1345 and the virtualization server 1305) and presented on client device 1345 via the receiver application 1360. If the previously established connection between the client device 1345 and the virtualization server 1305 has been disconnected, client device 1345 may attempt to reestablish the connection to virtualization server 1305 and remote desktop 1310. If the connection cannot be established, client device 1345 and/or receiver application 1360 may display an error message. Otherwise, once the connection has been established, client device 1345 and/or the receiver application 1360 may present the remoted application provided by virtualization server 1305 so as to allow the user of client device 1345 to view and/or edit the requested file.

If a request to access a file is not received (e.g., in step 1425), then in step 1445, client device 1345 may determine whether a request to open an application has been received. For example, in step 1445, client device 1345 may determine whether user input corresponding to a request to open an application included in native desktop 1365 has been received. If such a request has been received, then in step 1450, client device may launch and present a remoted application. The remoted application may, for instance, correspond to the application which was requested to be opened, and as in the examples discussed above, the remoted application may be provided by virtualization server 1305 and presented on client device 1345 via the receiver application 1360. If the previously established connection between the client device 1345 and the virtualization server 1305 has been disconnected, client device 1345 may attempt to reestablish the connection to virtualization server 1305 and remote desktop 1310. If the connection cannot be established, client device 1345 and/or receiver application 1360 may display an error message. Otherwise, once the connection has been established, client device 1345 and/or the receiver application 1360 may present the remoted application provided by virtualization server 1305 so as to allow the user of client device 1345 to interact with the requested application.

Subsequently, the method may end. Additionally or alternatively, one or more steps may be periodically repeated (e.g., in a loop) so as to enable continued synchronization of the cached representation of the remote desktop and/or continued processing of various requests, user input, and/or other input.

In the example method shown in FIG. 15, a mobile device may locally cache a representation of a remote desktop, as well as at least some of the substantive data for one or more files included in the remote desktop, and the mobile device may subsequently use this locally cached data in presenting a native desktop and, in certain instances, providing access to cached files. Additionally, in the example method shown in FIG. 15, the mobile device may locally cache the representation of the remote desktop and/or the file data without the involvement of a cloud-based storage platform.

In particular, the method may begin in step 1505 in which a receiver application may be launched. For example, in step 1505, client device 1345 may launch, open, and/or otherwise initiate execution of receiver application 1360, similar to how the receiver application may be launched in step 1405 discussed above. In step 1510, client device 1345 may establish a connection to virtualization server 1305, similar to how such a connection may be established in step 1410 discussed above. In step 1515, client device 1345 may cache a representation of remote desktop 1310, similar to how such a representation of a remote desktop may be cached in step 1415 discussed above.

In step 1520, client device 1345 may cache file data associated with remote desktop 1310. Such file data may, for instance, include substantive data included in and/or making up one or more files that are stored on and/or otherwise included in remote desktop 1310. As in the examples discussed above, client device 1345 may store and/or otherwise maintain the cached file data (e.g., in cache 1355) even after receiver application 1360 is closed and/or after a connection between client device 1345 and virtualization server 1305 is disconnected. By storing and/or maintaining the cached file data in this way, client device 1345 may enable offline access to the cached file data if, for instance, a user of the client device 1345 returns to receiver application 1360 and wishes to interact with cached files associated with remote desktop 1310. In some instances, in caching file data associated with remote desktop 1310, client device 1345 may download and/or cache data for all files that may be included in the user's remote desktop 1310, while in other instances, client device 1345 may download and/or cache data only for selected files. For example, particular files may be cached based on user preferences, space and/or bandwidth limitations, one or more algorithms, and/or other factors.

In step 1525, client device 1345 may present a native desktop based on the representation of remote desktop 1310 cached in step 1515, similar to how such a native desktop may be presented in step 1420 discussed above. In step 1530, client device 1345 may determine whether a request to access a cached file has been received. For example, in step 1530, client device 1345 may determine whether user input corresponding to a request to access a cached file included in native desktop 1365 has been received. If such a request has been received, then in step 1535, client device 1345 may determine whether a native editor for the cached file is available on client device 1345. As in the examples discussed above, such a native editor may, for instance, be a software application which is loaded on and/or executable by client device 1345 that allows the file (which, e.g., the user of client device 1345 has requested to access) to be viewed and/or edited.

If a native editor is available (e.g., in step 1535), then in step 1540, client device 1345 may open the cached file in the native editor. For example, client device 1345 may launch the native editor and/or cause the native editor to open the cached file data so as to allow the user of client device 1345 to view and/or edit the requested file. Because the file data is cached and a native editor is available, a network connection between the client device 1345 and virtualization server 1305 might not be required to allow the user of client device 1345 to view and/or edit the file. If any changes are made to the file data using the native editor, client device 1345 may update the cached file data stored and/or otherwise maintained in cache 1355 to reflect the changes, and the changes may be later synchronized with remote desktop 1310, for instance, by the receiver application 1360 when the native editor is closed, when the receiver application 1360 is closed, and/or when a network connection between client device 1345 and virtualization server 1305 can be established.

If a native editor is not available (e.g., in step 1535), then in step 1545, client device 1345 may launch and present a remoted application, similar to how such a remoted application may be launched and presented in step 1440 discussed above. Such a remoted application may, for example, enable a user of the client device 1345 to view and/or edit a file in instances where a native editor is not available on client device 1345, although the file itself may be cached on the client device 1345.

If a request to access a cached file is not received (e.g., in step 1530), then in step 1550, client device 1345 may determine whether a request to open an application or access a non-cached file has been received. If such a request has been received, then in step 1555, client device 1345 may launch and present a remoted application, similar to how such a remoted application may be launched and presented in the examples discussed above. Subsequently, and/or such a request has not been received, the method may end. Additionally or alternatively, one or more steps may be periodically repeated (e.g., in a loop) so as to enable continued synchronization of the cached representation of the remote desktop, continued synchronization of the cached file data, and/or continued processing of various requests, user input, and/or other input.

FIG. 16 illustrates another example method of presenting a native desktop at a computing device according to one or more illustrative aspects described herein. As indicated above, the steps illustrated in FIG. 16 may, in one or more embodiments, be executed by a mobile device, such as client device 1345. In addition, in the example method shown in FIG. 16, the mobile device may locally cache both a representation of a remote desktop and one or more files associated with the remote desktop by synchronizing with a cloud-based storage platform that may also synchronize data with one or more virtualization servers.

As seen in FIG. 16, the method may begin in step 1605 in which client device 1345 may determine whether a synchronization timer has expired. For example, client device 1345 may maintain a countdown timer that defines a predefined amount of time (e.g., sixty seconds, five minutes, one hour, etc.) after which the client device 1345 should attempt to synchronize cached data.

If the synchronization timer has expired (e.g., in step 1605), then in step 1610, client device 1345 may determine whether a connection to a cloud-based storage platform is available. For example, in step 1610, client device 1345 may determine whether a connection from client device 1345 to the one or more cloud servers 1335 and/or the cloud-based storage platform 1340 is available. If such a connection is available (e.g., in step 1610), then in step 1615, client device 1345 may connect to the cloud-based storage platform 1340. Subsequently, in step 1620, client device 1345 may determine whether there is data to synchronize with the cloud-based storage platform 1340. In determining whether there is data to synchronize, client device 1345 may determine whether there is new and/or updated info to download from and/or upload to the cloud-based storage platform 1340.

If there is data to synchronize (e.g., in step 1620), then in step 1625, client device 1345 may synchronize data with the cloud-based storage platform 1340. In this way, responsive to determining that the connection to the cloud-based storage platform 1340 is available, client device 1345 may synchronize local cache data with the cloud-based storage platform 1340, and as in the examples discussed above, this local cache data may include one or more files maintained on a remote desktop (e.g., remote virtual desktop 1310). In some instances, synchronizing the local cache data with the cloud-based storage platform may include updating the local cache data based on one or more changes made to at least one file on the remote desktop. For example, in synchronizing data with the cloud-based storage platform 1340, client device 1345 may update data stored in local cache 1355 based on one or more changes made on remote desktop 1310 to one or more synchronized files. Additionally or alternatively, synchronizing the local cache data may include updating information stored in the cloud-based storage platform based on changes made to at least one file on the computing device. For example, in synchronizing data with the cloud-based storage platform 1340, client device 1345 may update data stored in cloud-based storage platform 1340 to reflect changes made via native desktop 1365 and/or otherwise made on client device 1345 to one or more synchronized files.

After synchronizing data with the cloud-based storage platform 1340 (e.g., in step 1625) or after determining that there is no data to synchronize (e.g., in step 1620) or after determining that a connection to the cloud-based storage platform 1340 is not available (e.g., in step 1610), client device 1345 may, in step 1630, reset the synchronization timer. For example, in step 1630, client device 1345 may reset the synchronization timer to its original, full value, such that the synchronization timer may again begin counting down until the time at which the client device 1345 should again attempt to synchronize data with the cloud-based storage platform 1340.

In step 1635, client device 1345 may present and/or update a native desktop based on the local cache data. For example, in step 1635, client device 1345 may present a native desktop using data that may be stored in local cache 1355 and/or that may be otherwise cached by the client device 1345. In some instances, presenting the native desktop may include presenting an arrangement of one or more elements representing the remote desktop. For example, in presenting the native desktop, client device 1345 may present an arrangement of elements that match and/or otherwise reflect a corresponding arrangement of elements included in remote virtual desktop 1310. This may, for instance, include presenting a native desktop having a matching background as the remote desktop, a matching layout of menus and/or arrangement of icons, and/or other matching features so that the appearance of the native desktop reflects or substantially reflects the appearance of the remote desktop. Additionally, in one or more arrangements, the native desktop may be presented when a connection from the computing device to the cloud-based storage platform is not available. For example, in step 1635, client device 1345 may present native desktop 1365 even though a connection from client device 1345 to cloud-based storage platform 1340 is unavailable and/or cannot be established.

In step 1640, client device 1345 may determine whether a request to access a cached file has been received. For example, in step 1640, client device 1345 may determine whether user input corresponding to a request to access a cached file included in native desktop 1365 has been received. If such a request has been received, then in step 1645, client device 1345 may determine whether a native editor is available on client device 1345 for the cached file. As in the examples discussed above, such a native editor may be a software application which is loaded on and/or executable by client device 1345 that allows the cached file to be viewed and/or edited on the client device 1345.

If a native editor is available (e.g., in step 1645), then in step 1650, client device 1345 may open the cached file in the native editor. For example, client device 1345 may launch the native editor and/or cause the native editor to open the cached file data so as to allow the user of the client device 1345 to view and/or edit the cached file. If a native editor is not available (e.g., in step 1645), then in step 1655, client device 1345 may launch and present a remoted application, similar to how such a remoted application may be launched and presented in the examples discussed above. In particular, such a remoted application may, for example, enable a user of client device 1345 to view and/or edit a file in instances where a native editor is not available on client device 1345. Additionally, as in the examples discussed above, in launching and presenting a native editor, client device 1345 may connect to, or attempt to connect to, virtualization server 1305. Subsequently, and/or if a request to access to access a cached file is not received (e.g., in step 1640), the method may end. Additionally or alternatively, one or more steps may be periodically repeated (e.g., in a loop) so as to enable continued synchronization of the cached data and/or continuation processing of various requests, user input, and/or other input.

As illustrated above, various aspects of the disclosure relate to computer hardware and software for providing a native desktop (e.g., on a mobile device) using cloud-synchronized data mined from a remote desktop. While the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:
1. A method, comprising:
   determining, by a computing device, whether a connection to a cloud-based storage platform is available;
   responsive to determining that the connection to the cloud-based storage platform is available, synchronizing, by the computing device, local cache data with the cloud-based storage platform, wherein synchronizing the local cache data with the cloud-based storage platform comprises:
  receiving remote desktop data from the cloud-based storage platform, the remote desktop data comprising one or more files maintained on a remote virtual desktop, wherein the one or more files maintained on the remote virtual desktop are stored on the cloud-based storage platform by a desktop management service executed by a virtualization server comprising a hypervisor configured to create and manage one or more virtual machines associated with the remote virtual desktop; and
  storing the remote desktop data received from the cloud-based storage platform in a local cache on the computing device to update the local cache data; and
presenting, by the computing device, a native desktop based on the local cache data, wherein presenting the native desktop based on the local cache data comprises:
  receiving a request to access a cached file corresponding to a remote file maintained on the remote virtual desktop and stored in the local cache on the computing device during the synchronizing of the local cache data with the cloud-based storage platform;
  determining whether a native editor is available on the computing device to open the cached file corresponding to the remote file maintained on the remote virtual desktop and stored in the local cache on the computing device during the synchronizing of the local cache data with the cloud-based storage platform; and
  responsive to determining that the native editor is available on the computing device, opening, with the native editor on the computing device, the cached file corresponding to the remote file maintained on the remote virtual desktop and stored in the local cache on the computing device during the synchronizing of the local cache data with the cloud-based storage platform.

2. The method of claim 1, wherein synchronizing the local cache data with the cloud-based storage platform comprises updating the local cache data based on one or more changes made to at least one file maintained on the remote virtual desktop.

3. The method of claim 1, wherein synchronizing the local cache data comprises updating information stored in the cloud-based storage platform associated with at least one file maintained on the remote virtual desktop based on changes made to at least one corresponding file stored in the local cache on the computing device.

4. The method of claim 1, wherein presenting the native desktop based on the local cache data comprises presenting an arrangement of one or more elements representing the remote virtual desktop comprising one or more of a background associated with the remote virtual desktop, a layout of menus associated with the remote virtual desktop, or an arrangement of icons associated with the remote virtual desktop.

5. The method of claim 1, wherein the native desktop is presented when the connection to the cloud-based storage platform is not available.

6. The method of claim 1, comprising:
responsive to determining that the connection to the cloud-based storage platform is not available, resetting, by the computing device, a synchronization timer configured to cause the computing device to attempt to synchronize data with the cloud-based storage platform at a later time.

7. The method of claim 1, comprising:
responsive to determining that the native editor is not available on the computing device, presenting, by the computing device, a remoted application to open the cached file corresponding to the remote file maintained on the remote virtual desktop and stored in the local cache on the computing device during the synchronizing of the local cache data with the cloud-based storage platform, the remoted application being provided by a virtualization server and presented on the computing device via a receiver application.

8. The method of claim 1, wherein presenting the native desktop based on the local cache data comprises presenting the native desktop using a receiver application that is configured to enable a user of the computing device to view the native desktop when a network connection cannot be established to a virtualization server associated with the remote virtual desktop.

9. The method of claim 1, wherein the remote desktop data comprises one or more application shortcuts, one or more documents, one or more registry keys, one or more personalization settings, or one or more layout settings.

10. The method of claim 1, comprising:
enforcing, by the computing device, based on state information associated with the computing device, one or more policies on the native desktop to control behavior of the native desktop.

11. The method of claim 1, wherein at least one policy of the one or more policies enforced on the native desktop is configured to selectively prohibit one or more specific applications from accessing the remote desktop data stored in the local cache on the computing device based on the state information associated with the computing device.

12. A computing device, comprising:
at least one processor; and
memory storing computer-readable instructions that, when executed by the at least one processor, cause the computing device to:
  determine whether a connection to a cloud-based storage platform is available;
  responsive to determining that the connection to the cloud-based storage platform is available, synchronize local cache data with the cloud-based storage platform, wherein synchronizing the local cache data with the cloud-based storage platform comprises:
    receiving remote desktop data from the cloud-based storage platform, the remote desktop data comprising one or more files maintained on a remote virtual desktop, wherein the one or more files maintained on the remote virtual desktop are stored on the cloud-based storage platform by a desktop management service executed by a virtualization server comprising a hypervisor configured to create and manage one or more virtual machines associated with the remote virtual desktop; and
    storing the remote desktop data received from the cloud-based storage platform in a local cache on the computing device to update the local cache data; and
  present a native desktop based on the local cache data, wherein presenting the native desktop based on the local cache data comprises:

receiving a request to access a cached file corresponding to a remote file maintained on the remote virtual desktop and stored in the local cache on the computing device during the synchronizing of the local cache data with the cloud-based storage platform;

determining whether a native editor is available on the computing device to open the cached file corresponding to the remote file maintained on the remote virtual desktop and stored in the local cache on the computing device during the synchronizing of the local cache data with the cloud-based storage platform; and responsive to determining that the native editor is available on the computing device, opening, with the native editor on the computing device, the cached file corresponding to the remote file maintained on the remote virtual desktop and stored in the local cache on the computing device during the synchronizing of the local cache data with the cloud-based storage platform.

13. The computing device of claim 12, wherein synchronizing the local cache data with the cloud-based storage platform comprises updating the local cache data based on one or more changes made to at least one file maintained on the remote virtual desktop.

14. The computing device of claim 12, wherein synchronizing the local cache data comprises updating information stored in the cloud-based storage platform associated with at least one file maintained on the remote virtual desktop based on changes made to at least one corresponding file stored in the local cache on the computing device.

15. The computing device of claim 12, wherein presenting the native desktop based on the local cache data comprises presenting an arrangement of one or more elements representing the remote virtual desktop comprising one or more of a background associated with the remote virtual desktop, a layout of menus associated with the remote virtual desktop, or an arrangement of icons associated with the remote virtual desktop.

16. The computing device of claim 12, wherein the native desktop is presented when the connection to the cloud-based storage platform is not available.

17. The computing device of claim 12, wherein the memory stores additional computer-readable instructions that, when executed by the at least one processor, cause the computing device to:

responsive to determining that the connection to the cloud-based storage platform is not available, reset a synchronization timer configured to cause the computing device to attempt to synchronize data with the cloud-based storage platform at a later time.

18. The computing device of claim 12, wherein the memory stores additional computer-readable instructions that, when executed by the at least one processor, cause the computing device to:

responsive to determining that the native editor is not available on the computing device, present a remoted application to open the cached file corresponding to the remote file maintained on the remote virtual desktop and stored in the local cache on the computing device during the synchronizing of the local cache data with the cloud-based storage platform, the remoted application being provided by a virtualization server and presented on the computing device via a receiver application.

19. The computing device of claim 12, wherein presenting the native desktop based on the local cache data comprises presenting the native desktop using a receiver application that is configured to enable a user of the computing device to view the native desktop when a network connection cannot be established to a virtualization server associated with the remote virtual desktop.

20. One or more non-transitory computer-readable media storing instructions that, when executed by a computing device, cause the computing device to:

determine whether a connection to a cloud-based storage platform is available;

responsive to determining that the connection to the cloud-based storage platform is available, synchronize local cache data with the cloud-based storage platform, wherein synchronizing the local cache data with the cloud-based storage platform comprises:

receiving remote desktop data from the cloud-based storage platform, the remote desktop data comprising one or more files maintained on a remote virtual desktop, wherein the one or more files maintained on the remote virtual desktop are stored on the cloud-based storage platform by a desktop management service executed by a virtualization server comprising a hypervisor configured to create and manage one or more virtual machines associated with the remote virtual desktop; and storing the remote desktop data received from the cloud-based storage platform in a local cache on the computing device to update the local cache data; and present a native desktop based on the local cache data, wherein presenting the native desktop based on the local cache data comprises:

receiving a request to access a cached file corresponding to a remote file maintained on the remote virtual desktop and stored in the local cache on the computing device during the synchronizing of the local cache data with the cloud-based storage platform;

determining whether a native editor is available on the computing device to open the cached file corresponding to the remote file maintained on the remote virtual desktop and stored in the local cache on the computing device during the synchronizing of the local cache data with the cloud-based storage platform; and responsive to determining that the native editor is available on the computing device, opening, with the native editor on the computing device, the cached file corresponding to the remote file maintained on the remote virtual desktop and stored in the local cache on the computing device during the synchronizing of the local cache data with the cloud-based storage platform.

* * * * *